United States Patent
Flowers et al.

(10) Patent No.: US 7,380,517 B2
(45) Date of Patent: Jun. 3, 2008

(54) METHOD FOR MAINTAINING CLEANLINESS OF ANIMAL WATER DISPENSERS

(76) Inventors: Woodie C. Flowers, 214 Boston Post Rd., Weston, MA (US) 02493; Cesar Bugarin, 321 Mary Bee La., Medford, OR (US) 97504

( * ) Notice: Subject to any disclaimer, the term of this patent is extended or adjusted under 35 U.S.C. 154(b) by 0 days.

(21) Appl. No.: 11/800,726

(22) Filed: May 7, 2007

(65) Prior Publication Data

US 2007/0209600 A1    Sep. 13, 2007

Related U.S. Application Data

(60) Division of application No. 11/258,947, filed on Oct. 26, 2005, now Pat. No. 7,219,623, which is a continuation of application No. 10/921,780, filed on Aug. 19, 2004, now Pat. No. 6,959,665, which is a continuation of application No. 10/339,167, filed on Jan. 9, 2003, now Pat. No. 6,799,533.

(51) Int. Cl.
*A01K 45/00* (2006.01)

(52) U.S. Cl. ............... 119/69.5; 119/74; 119/61.57

(58) Field of Classification Search ............... 119/69.5, 119/74, 72, 61.57, 61.4, 61.5, 57.9, 51.5; 248/121; D30/123, 129, 132; 239/27, 280, 239/200, 281, 280.5, 273; 4/644, 627, 638
See application file for complete search history.

(56) References Cited

U.S. PATENT DOCUMENTS

| | | | |
|---|---|---|---|
| 187,147 A | 2/1877 | Jennings | |
| 578,374 A | 3/1897 | Trull | |
| 599,706 A | 3/1898 | Heineken | |
| 1,268,256 A | 6/1918 | Leyh | |
| 2,654,346 A * | 10/1953 | Goff | ............ 119/81 |
| 2,887,988 A | 5/1959 | Cottongim | |

(Continued)

*Primary Examiner*—Yvonne R. Abbott
(74) *Attorney, Agent, or Firm*—Steven J. Weissburg

(57) ABSTRACT

An animal water bowl assembly is maintained clean by allowing a bowl to dry out after a use period, before refilling. Uses include: birdbath and pet and farm animal watering. Two bowls can be coordinated so that one is in use with water while one is drying out. A two-faced assembly with oppositely facing bowls can automatically coordinate the steps for the two bowls. The process of filling a bowl, allowing it to be used, emptying it, filling another, allowing it to be used while the first dries out, can be automated with an actuator and a controller. An animal water bowl assembly has at least two bowls, with means for coordinating the filling and use and drying steps. As an example, a two faced bowl is rotatable around an axis. An electronic controller opens a valve to provide power to a hydraulic actuator, which flips the two faced bowl to empty the first and present the second for filling. Filling with water occurs automatically, also using water from the hydraulic source. Many versions only require a user to set a duration on a controller, during which time hydraulic power is provided, which duration is sufficient to flip and fill the two bowls of an assembly. Flipping and filling occur automatically at the right times. A user interface has a single valve, and a single cycle. The user sets a period for activation, and the duration that power is provided. More than two bowls can be used. Electromechanical, rather than hydraulic power can be used to actuate the assembly.

11 Claims, 24 Drawing Sheets

U.S. PATENT DOCUMENTS

| | | | |
|---|---|---|---|
| 3,306,262 A * | 2/1967 | Hart | 119/72 |
| 3,696,786 A | 10/1972 | Garwood | |
| 3,967,588 A | 7/1976 | Brown | |
| 3,995,591 A | 12/1976 | Garwood | |
| 4,399,772 A | 8/1983 | Salinas | |
| 4,463,706 A | 8/1984 | Meister et al. | |
| 4,630,569 A | 12/1986 | Dieleman | |
| 4,654,670 A | 3/1987 | Fleming | |
| 5,008,963 A | 4/1991 | Stein | |
| 5,335,625 A | 8/1994 | Rawlings et al. | |
| D364,546 S | 11/1995 | Tieffel et al. | |
| 5,692,454 A | 12/1997 | Testa | |
| 5,743,212 A | 4/1998 | Forjohn | |
| 5,931,118 A | 8/1999 | Thompson | |
| 6,167,840 B1 | 1/2001 | White et al. | |
| 6,328,273 B1 | 12/2001 | Kemikem | |
| 6,338,220 B1 | 1/2002 | Dicks | |
| D459,840 S | 7/2002 | Lian | |
| 2004/0065790 A1 | 4/2004 | Frey | |
| 2006/0037545 A1* | 2/2006 | Bradley | 119/69.5 |

* cited by examiner

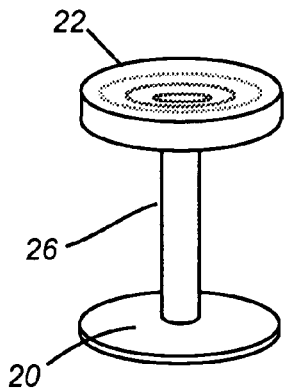
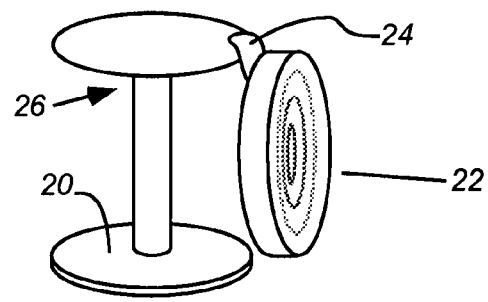
*Fig. 3A*  *Fig. 3B*
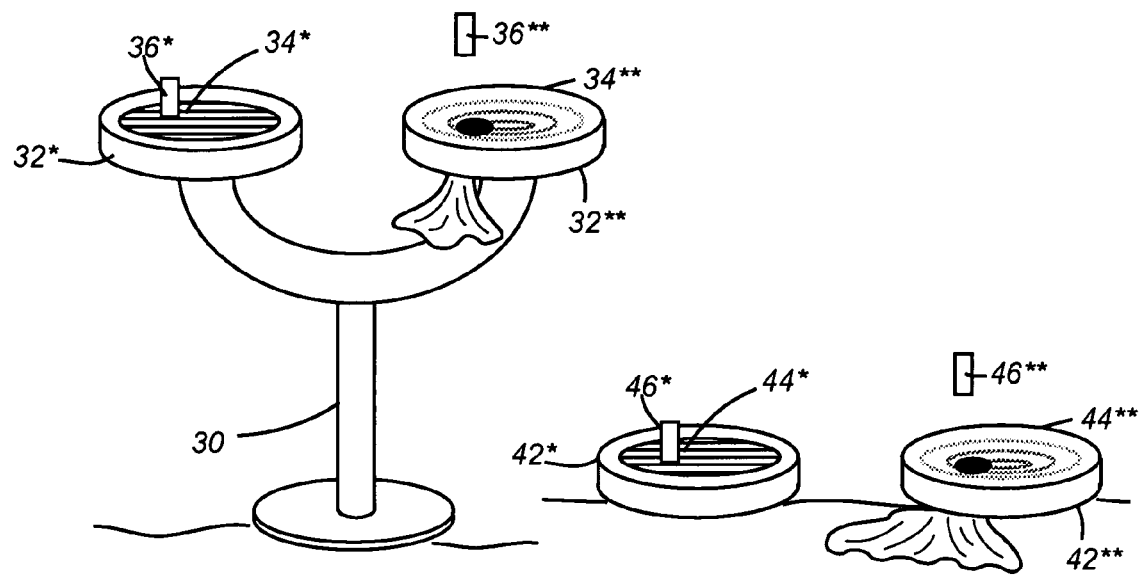
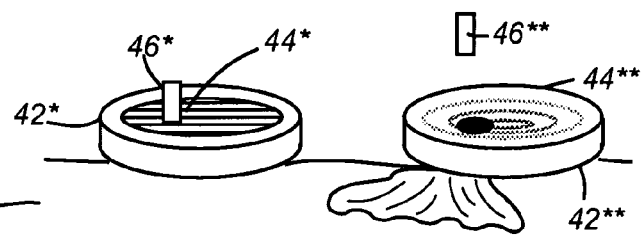
*Fig. 4A*  *Fig. 4B*

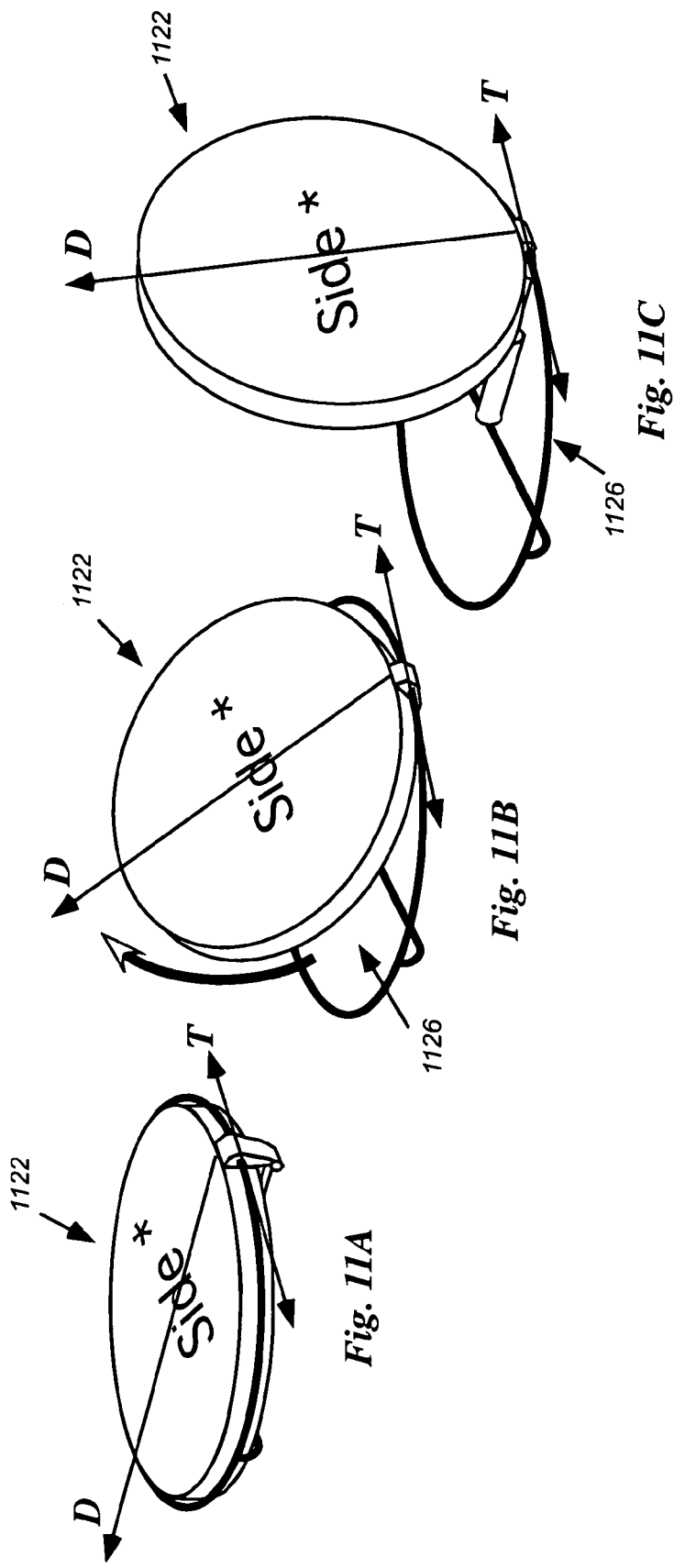

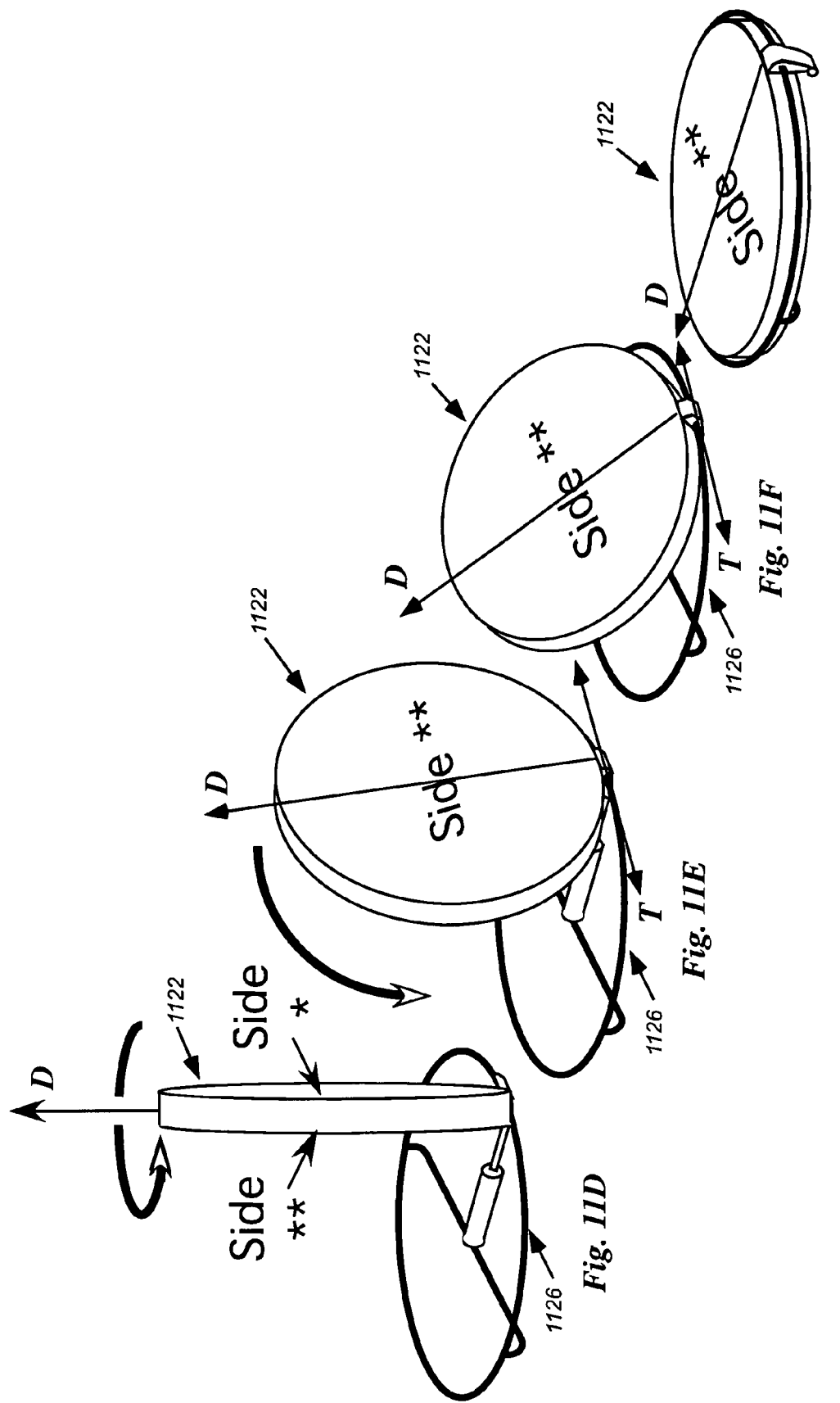

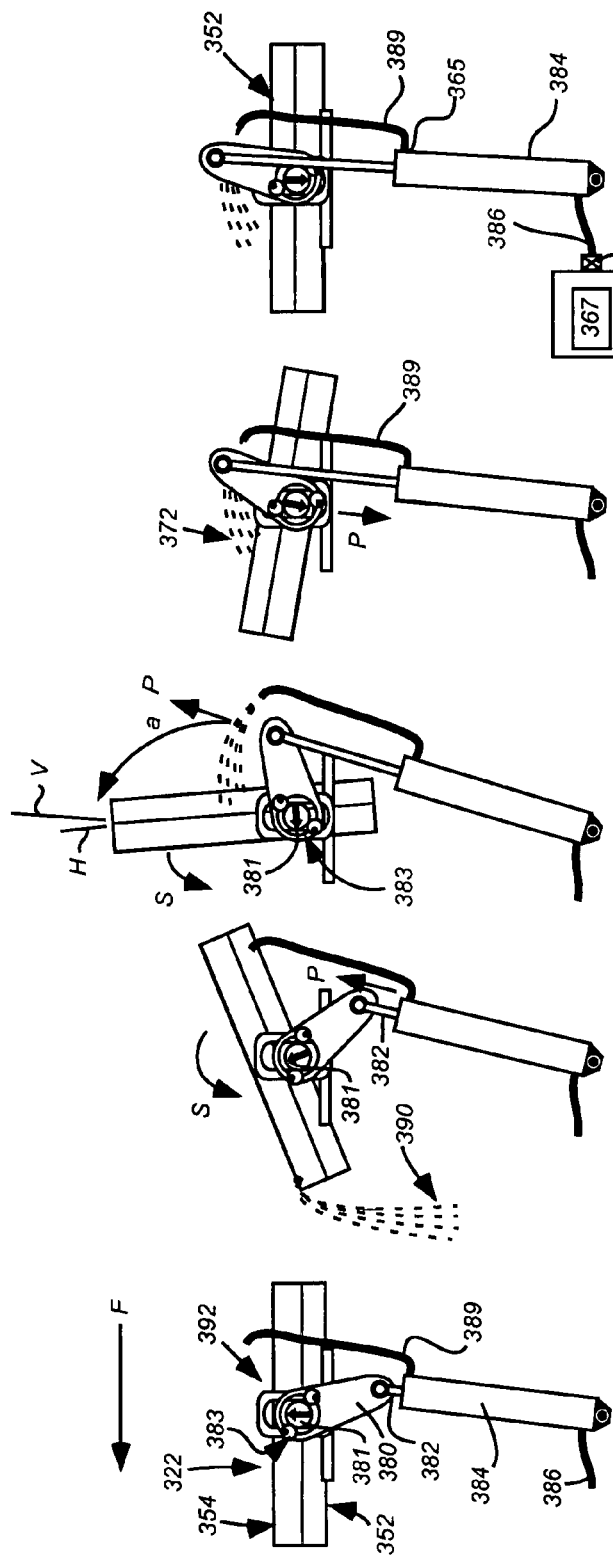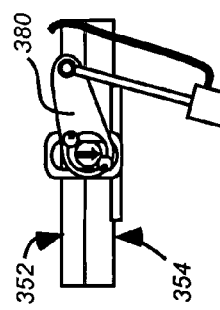

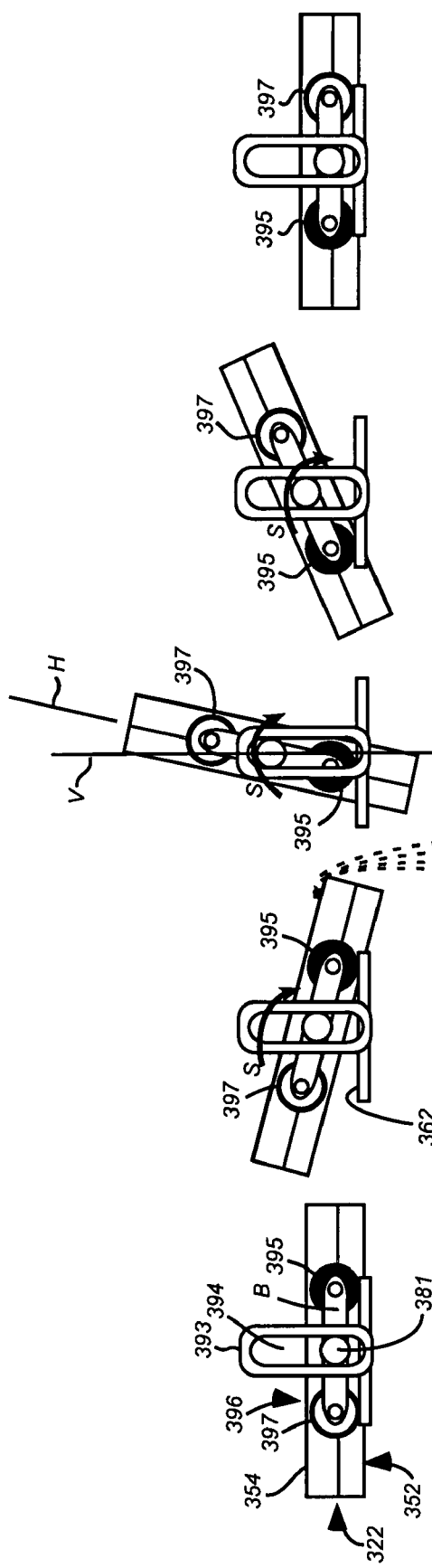

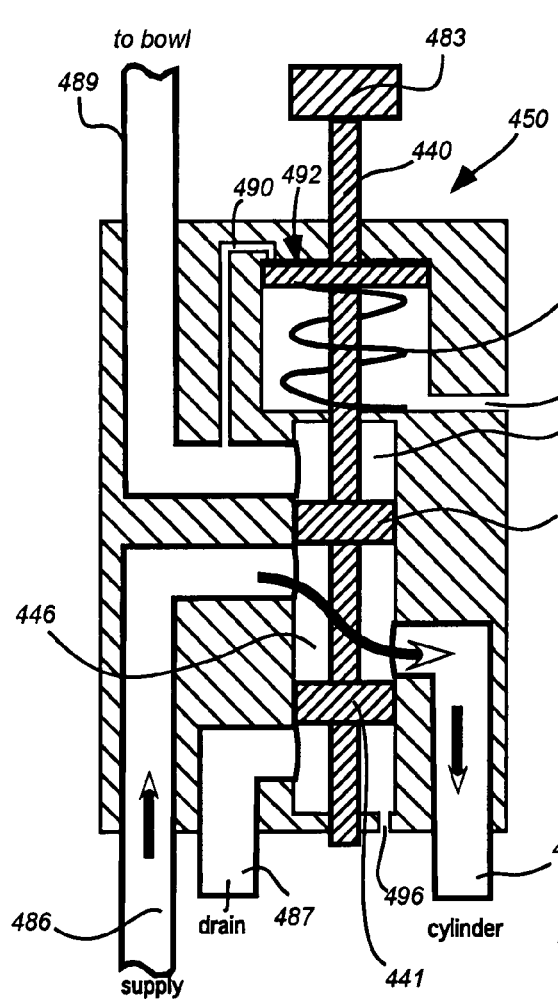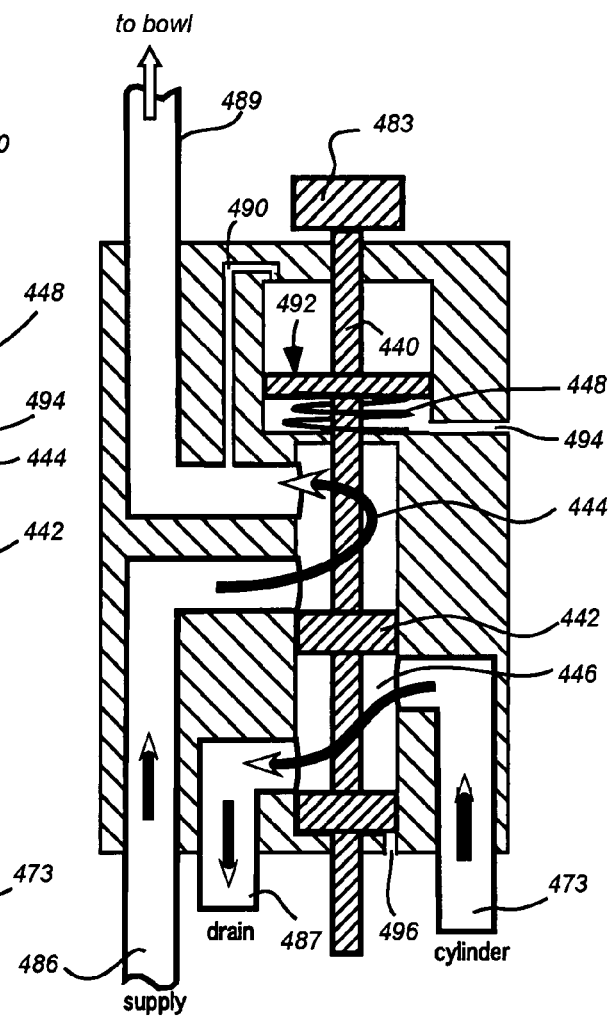
*Fig. 24A*  *Fig. 24B*

METHOD FOR MAINTAINING CLEANLINESS OF ANIMAL WATER DISPENSERS

This is a divisional of U.S. application Ser. No. 11/258,947, filed on Oct. 26, 2005, which is a continuation of a U.S. application Ser. No. 10/921,780, filed on Aug. 19, 2004, now U.S. Pat. No. 6,959,665 B2, which is a continuation of U.S. application, U.S. Ser. No. 10/339,167, filed on Jan. 9, 2003, now U.S. Pat. No. 6,799,533 B2, and claims the benefit of those earlier applications. The entire disclosure of those applications are hereby incorporated fully herein, by reference.

The inventions disclosed herein will be understood with regard to the following description, appended claims and accompanying drawings, where:

BRIEF DESCRIPTION OF FIGURES

FIG. 3A shows, schematically, a birdbath bowl, deployed for use;

FIG. 3B shows, schematically, a detachable birdbath bowl, as shown in FIG. 3A, positioned to dry out, and not available for use;

FIG. 4A shows a two-bowl birdbath pedestal, each bowl having a removable plug to allow water to drain out, with one bowl shown full, and the other shown draining;

FIG. 4B shows a two-bowl ground supported birdbath pair, each bowl having a removable plug to allow water to drain out, with one bowl shown full, and the other shown draining;

FIGS. 11A-11G show schematically a two-faced bowl, arranged initially with one side * concave facing upward (FIG. 11A); then tipped up around one end of a diameter (FIG. 11B); stood with the diameter vertical (FIG. 11C); spun around the diameter (FIG. 11D); and tipped downward (FIGS. 11E and 11F) to present the opposite side ** concave facing-upward (FIG. 11G);

FIGS. 14A-14G show schematically a fully automated apparatus similar to that shown in FIG. 13 that lifts and flips a two-faced bowl 180°, and returns the opposite surface ready for use, with a cam assembly being located on the opposite end of the axle from a piston assembly;

FIGS. 15A-15E show schematically the apparatus shown in FIGS. 14A-14G, from the opposite (cam assembly end) side elevation, with corresponding FIGS. 14A, 15A, etc. showing identical stages of the sequence, with 15E corresponding to 14E, 14F and 14G;

FIG. 15F shows schematically, an apparatus similar to that shown in FIGS. 15A-15E, except that the cam assembly is a sliding cam assembly, with a unitary oblong follower rather than two separate followers, in an orientation corresponding to that shown in FIG. 15C;

FIG. 22A is an enlargement of a portion of the transmission of FIG. 22;

FIGS. 24A and 24B are schematic cross-sectional representations of a two position control valve, suitable for use with the cylinder drive shown in FIG. 23A-23D.

DETAILED DISCUSSION

Figure 1:
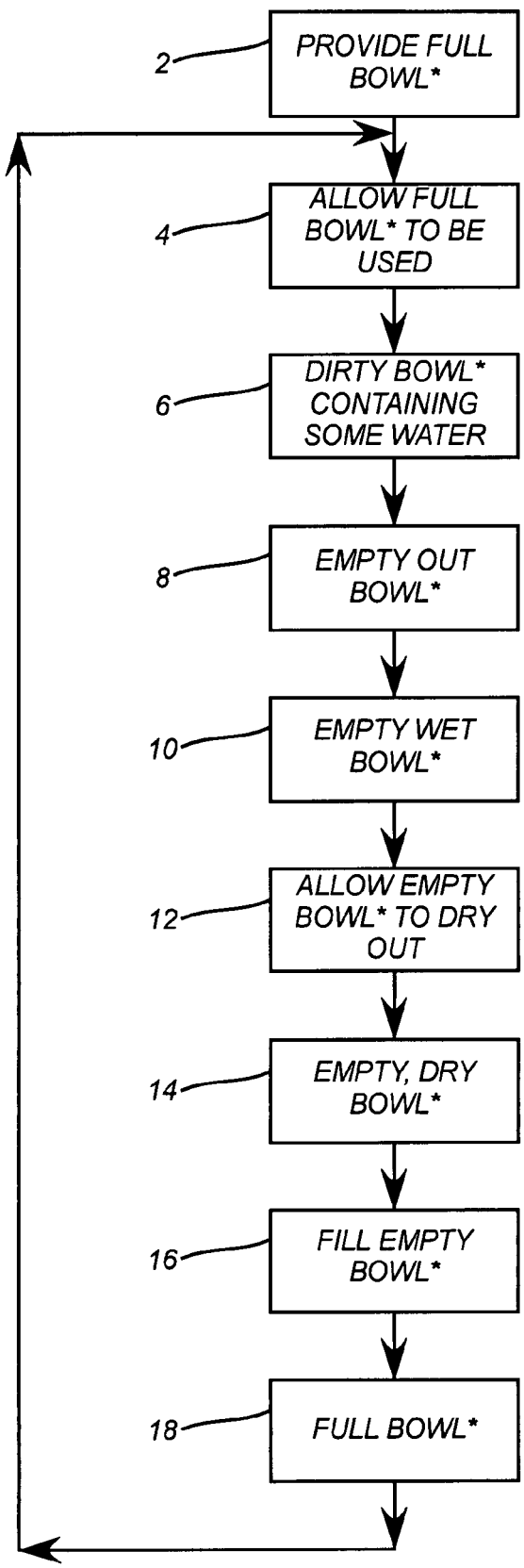
FIG. 1 shows schematically in flow chart form a method for maintaining a birdbath bowl relatively free of contaminants.

Birdbaths are common items that are known and used in many designs. They provide a supply of water that is important to birds, both to drink and to bathe. Birds continually visit birdbaths. Observing these visits brings satisfaction to many people.

Birdbaths are available in a variety of functional and ornamental styles, from simple, naturalistic stone or wood to colorful elaborate sculptures. The typical birdbath includes at least one bowl for holding a quantity of water, arranged so that birds can bathe in the bowl and also drink from the bowl, a pedestal to support the bowl above ground level and a means to support and stabilize the pedestal where it makes contact with the ground. A birdbath bowl can be a vessel of any shape or configuration that has a concave area that retains water. It is typically helpful that the shape be not so deep as to provide a danger of drowning, although, this is not always the case. Many baths do not include a pedestal, but rather, rest on the ground. Most of nature's bird-bathing facilities are at ground level.

For a birdbath to provide an adequate supply of fresh and clean water, the bowl that holds the water must be kept relatively clean, and the bowl must be filled with a new supply of water regularly.

Keeping a birdbath bowl clean is difficult and complex. Birds regularly visit muddy and other unclean locations and then bathe in birdbaths, bringing contaminants to even the tidiest bowl. For instance, robins take a bath in dust to eliminate insects, and then visit the birdbath. In all birdbaths, contaminants including bacteria, algae, viruses, feathers, excrement, leaves, twigs, insects, pollen, dust and other foreign and potentially harmful substances enter the water after only a few days. Contaminated water in a birdbath can spread disease and harm birds in other ways. Therefore, birdbaths should be cleaned often to ensure that their bowls and water are free of contaminants.

The contaminants often form a tenacious film, or layer of material adhered to the birdbath surface, especially if the surface is left unclean and wet for even short periods of time. This problem may be exacerbated with bowls that are textured or porous. Contaminants and stagnant water also may provide a breeding ground for harmful or pest insects such as mosquitoes, which are of particular concern during outbreaks of diseases, such as the West Nile virus.

Cleaning involves successful removal of foreign contaminants that have entered the birdbath bowl. Then, the birdbath is refreshed (refilled) with a new supply of water. Doing both functions in sequence ensures an abundance of clean, safe water for the birds.

Current methods of cleaning involve manual scrubbing and/or spraying or using chemicals to control and remove contaminants. Many bird watchers would prefer not to introduce chemicals to water intended for birds since they may cause unforeseen harm to birds. Moreover, not many birdbath chemicals exist and those available are expensive.

Most people do not provide the maintenance necessary to remove contaminants and to ensure a plentiful supply of fresh water. A birdbath that has a design that minimizes the need for user upkeep, would be beneficial, whether it is semi-automated to reduce user involvement, or fully-automated to completely eliminate user upkeep.

The primary focus of this disclosure is birdbaths. However, there are other types of liquid containers that present similar maintenance issues. For instance, it is fairly common for dog and cat owners to leave a filled water bowl outside, typically on the ground, or on a low support, for the pet to access when outside. This might be used routinely, or while the owner is away from home, at work, etc. Such bowls are subject to most of the water fouling agencies that also foul birdbaths. Only the bird bathing problems are absent, but, in fact, birds may even bathe in such pet supply bowls, in which case, all of the problems are present. The inventions described herein with respect to birdbaths can also be used in connection with pet water supply bowls.

In addition to domestic pets, other animals are supplied with water by bowls that remain generally in place for days, and must periodically be cleaned and replenished. Such other contexts include zoo animals, animals housed in kennels, and many farm animals. In general, larger animals require larger containers, sometimes shaped more like a deep trough, than a bowl. The inventions described herein can also be used with such zoo, farm, and kennel type water containers.

Furthermore, there are other liquid containers that retain liquid for some time, typically outdoors, but also indoors. These include: decorative fountains and water features for gardens and landscape designs, certain vessels used in laboratories and manufacturing processes, etc.

Known designs for birdbaths have included many types of so called self-cleaning baths.

Frequent Drying out Maintains Cleanliness of Water Bowls

It has been determined, as an aspect of an invention disclosed herein, that it is advantageous to provide a period of time during which the bowl that contains the water is able to dry, preferably, completely so that no liquid remains. Drying out the bowl prevents algae and other contamination from getting started. If complete drying is not possible, it is beneficial to achieve partial drying to a degree that algae and other persistent growths are reduced. If the bowl surface is not allowed to dry before being refilled, the fresh source of water in the bowl provides an environment and possibly nutrients needed by the algae and other contaminants for their continued persistence, growth and spreading on the bowl's surface. Not only does such adhered material present a problem in its own right, but it also provides a mechanical substrate, or foundation, upon which additional material can take hold, thus, further increasing the problem of adhered contaminants.

The water in the bowl can be removed from the bowl through any effective manual, semi-automated or automated dumping movement of the bowl or draining action upon the bowl. Evaporation of a full bowl from natural causes is not a part of the inventions—it is typically not fast enough to be effective for emptying the bowl. (Evaporation of the residue of adhered water after a mechanical dump or drain is part of the inventions disclosed herein.)

Various aspects of methods and apparatus suitable for periodic filling and drying are discussed herein, as aspects of inventions disclosed herein.

In a rudimentary form, an invention disclosed herein is a method for maintaining a birdbath essentially free of adhering contaminants. It includes the steps of filling the bowl, allowing it to be used, and then, emptying out the bowl completely and allowing it to partially or completely dry.

This empty time allows the bowl to completely, or at least, partially dry, thereby interrupting the process that allows algae and other contaminants to develop and adhere. After this drying period, the bowl is filled again and redeployed for use.

FIG. 1 shows a schematic diagram of this method, showing the bowl states and beginning with the step of providing 2 a full bowl. The bowl then cycles through the following set of steps and states. The full bowl is allowed to be used 4 by the birds, eventually leading 6 to a dirty bowl containing some water. By dirty, it is meant not pristine. Contaminants may reside in the water, free of the bowl surface, or, may be starting to adhere to the surface. The next step is to empty out 8 the bowl leaving 10 an empty bowl with a wet surface. The empty bowl is allowed 12 time for the surface to dry. The now 14 empty and sufficiently dry bowl is then filled 16 with water resulting 18 in a full bowl. Then, to complete the cycle, the bowl is allowed to be used 4 again by the birds.

It is preferable for the step of allowing 4 the bowl to remain full not to last long enough for contaminants become strongly adhered to the bowl.

With this rudimentary method, while a single bowl is drying out, the birds have nothing in which to bathe, or from which to drink. Starting 2 with the bowl in the full stage 18 is arbitrary. The drying state 14 or any of the other states could equally be considered the starting state for the process.

Using Two Bowls Ensures that One is Available for Use

Figure 2:
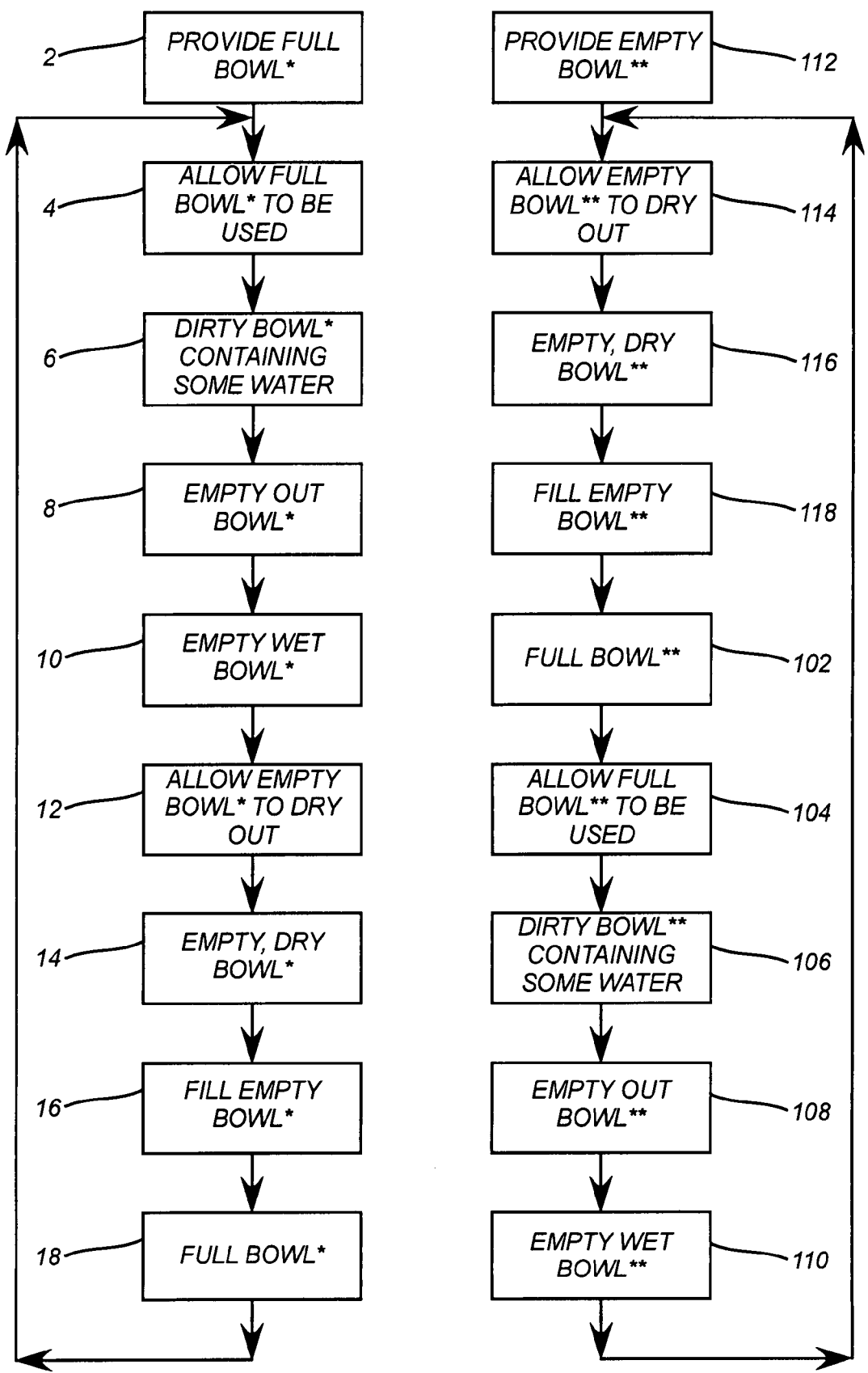
FIG. 2 shows schematically in flow chart form a method for maintaining at least two birdbath bowls relatively free of contaminants, with one of the bowls always being available for use by birds.

Thus, it may be advantageous to provide at least two bowls, so that while one is drying out, the other is full and deployed, and vise versa. Thus, the birds are never deprived of water during the period of time any one bowl is drying. FIG. 2 shows this second method schematically, showing two birdbath bowls, a first bowl* (star) being provided 2 with a full bowl of water and another bowl (double star) being provided 103 empty. Each birdbath bowl (star and double star) cycles through the same states as in the rudimentary method described above and shown schematically in FIG. 1, but the state of the second bowl is offset from the state of the first bowl* at any given point in the cycle. (The states and steps applied to the second bowl** are indicated by reference numerals that are offset by 100 from the reference numerals that identify the steps and states for the first bowl*.)

The first bowl* is full and is allowed to be used 4 by the birds while the other bowl** is empty and allowed 112 to dry out. After the first bowl* has become 6 dirty and still contains some water, the other bowl** is empty and has become 114 dry. The first bowl* is emptied out 8 while the other, empty bowl** is filled 116. The first bowl* is then empty and wet 10 as the other bowl** becomes 118 full. The first, empty bowl* is allowed 12 to dry out, while the other bowl** is full 102 and allowed 104 to be used by the birds. The first, empty bowl* becomes 14 sufficiently dry during the period the other bowl** and its water becomes 106 dirty. Next, the first empty bowl* is filled 16 as the other bowl** is emptied out 108. Finally, the first bowl* is full 18 while the other bowl**, though still wet, becomes empty 110 before the bowls cycle back to the states of the first bowl* full and allowed 4 to be used by the birds while the other bowl** is empty and allowed to dry out 112. (The designation first and second, or other are entirely arbitrary, being used for discussion purposes only, and the process is totally symmetric relative to the two bowls. They are equivalent.)

The changes from one stage or step to the next need not occur precisely simultaneously for the two bowls. All that is required is that at substantially all times, one bowl is available for bird use, and that each bowl remains empty for a time that is long enough for the surface to dry. Thus, there may be a time period during which both bowls are full, but there should not be a significant time where both are empty.

The second method can readily be generalized to three or any larger plurality of bowls, by the person of ordinary skill in the art, and these combinations are also considered to be aspects of inventions disclosed herein.

Some experiments have been done in Massachusetts, USA at an inland environment. These have shown that moderately frequent cycling, for instance, even as infrequently as emptying, drying, filling, once per day, prevent any significant growth, and results in significantly less growth and adherence of contaminants, as compared to a control bowl kept constantly full.

It is also possible to add a heating element embedded within the bowl, such as are used in baths designed to be used during the winter in freezing climates, to accelerate drying of the surface.

Bowl Configuration Variations

The methods described above can physically deploy and cycle the birdbath bowls in many and various mechanical and geometrical combinations, some of which, by way of example only and not to be considered limiting, are discussed below.

FIG. 3A shows a simple single birdbath bowl set-up that uses a rudimentary one-bowl method. A pedestal 26 and ground support 20 is shown with a bowl 22 that is readily detachable and re-attachable to the pedestal 26. The user detaches and empties the bowl 22 and hangs the bowl, as shown in FIG. 3B, from the pedestal 26 using a hook 24 that can attach to a location on the pedestal 26 to allow drying. The bowl could alternatively be placed anywhere during this drying period. The user then re-attaches the bowl 22 to the pedestal 26 and refills the bowl with water. Alternatively, after emptying, the bowl could be returned to its concave facing upward position to dry, however, the user may find that in some circumstances, the lack of constantly available water will prevent birds from becoming used to the bath as a reliable water source. Choice among the alternatives could depend on how sunny and humid the weather is, which would have opposite effects on drying time. Choice might also depend on the user's aesthetic preference or yard arrangement.

FIG. 4A shows a pedestal structure 30 used for maintaining two independent birdbath bowls 32*, 32** up off the ground. The bowls 32* and 32** are always maintained in an upright configuration in this geometry. A hole 34*, 34** and a plug 36*, 36** is provided in each bowl to allow the user to empty each bowl in turn to dry while the other bowl is full and in use. However, rather than using the hole and plug method for draining the bowls, each could be flipped and hung or replaced, as shown in FIG. 3B.

FIG. 4B shows two independent birdbath bowls 42*, 42** on or near to the ground, essentially as ground supported low profile baths. The bowls 42* and 42** are always maintained in an upright configuration in this geometry. A hole 44*, 44** and a plug 46*, 46** is provided in each bowl to allow the user to empty each bowl in turn to dry while the other bowl is full and in use. However, rather than using the hole and plug method for draining the bowls, each could be flipped and tilted to dry or replaced, as shown in FIG. 3A.

Figure 5A:
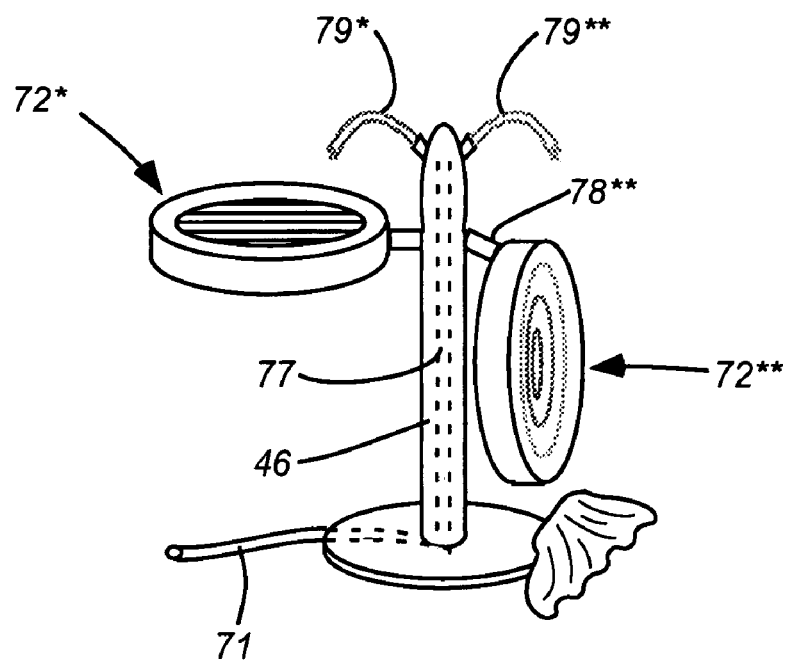
FIG. 5A shows, schematically, a two-bowl birdbath pedestal, in which each bowl is mounted to the pedestal by a hinge, that can be released to allow the bowl to empty out, and hang to dry.

FIG. 5A shows a pedestal 46 and two independent birdbath bowls 72* and 72**. Each bowl is attached by a hinge 78*, 78 to the pedestal. One hinge is unlocked (78, as shown) and its bowl **72\*\*lowered, while the other hinge 78\* is locked with its bowl 72\*** in the upright, concave upward facing, in-use position.

Figure 5B:
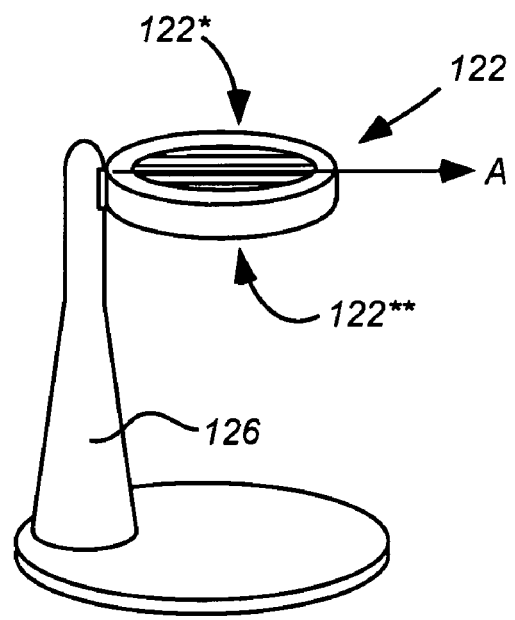
FIG. 5B shows, schematically a bowl cantilevered from a pedestal.

FIG. 5B shows a pedestal 126 from which a two-faced bowl 122 is cantilevered. It has two back-to-back bowls 122\* and **122\*\*. The bowl 122** can rotate around the axis A. The bowl can be flipped manually, automatically or semi-automatically.

Rather than a simple pedestal, as shown, a hanger support can be provided from which the bowl is suspended. Of course, ultimately, such a hanger needs to be supported by the ground, such as by a rooted tree, or portion of a building (for instance a house, or other structure. Thus, even hanging supports are versions of spatially extended pedestals).

Figure 6:
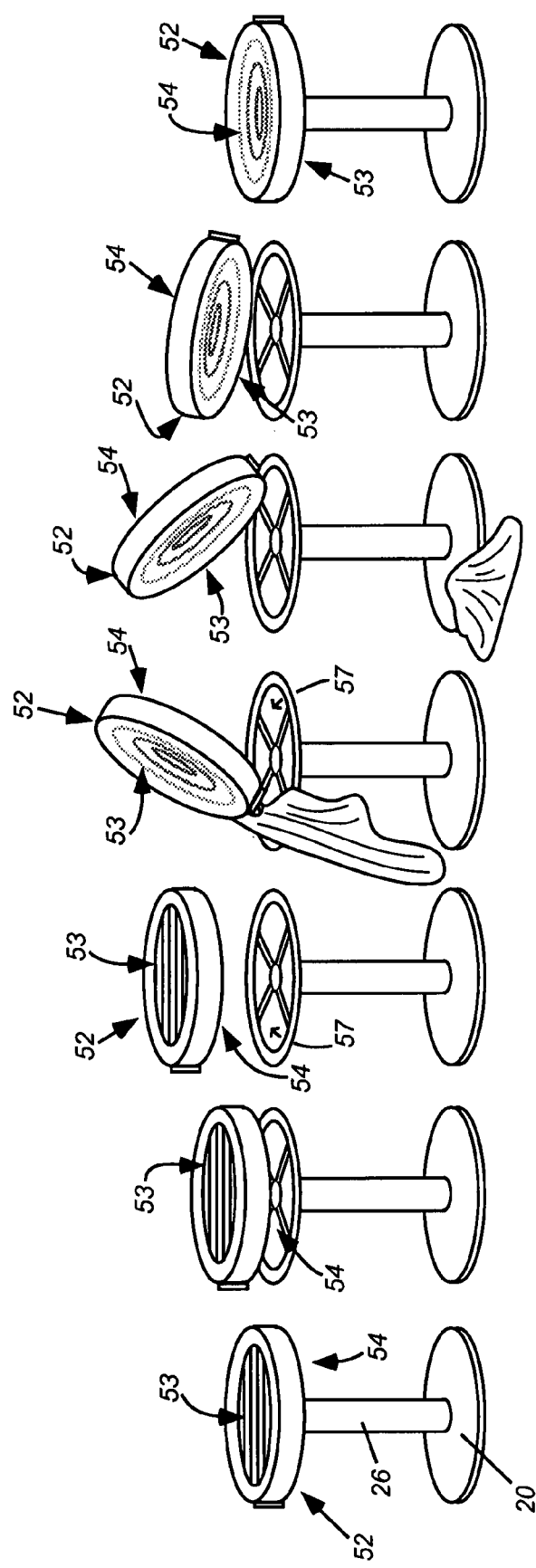
FIG. 6 shows schematically a sequence of states of a two-faced bowl, that is initially full, then is lifted, tipped, emptied of water, flipped to provide the other bowl facing upward, and then ready for filling of the now upward facing bowl.

FIG. 6 shows an integrated back-to-back double-bowl design. The two birdbath bowls 53 and 54 are integrated into a unitary structure 52, with one bowl on each side of the structure, facing away from each other. The structure is simply lifted and flipped over, placed back on its pedestal 26 and the new concave upward-facing bowl 54 filled with water while the new concave downward facing bowl 53 is allowed to dry. Drying may be facilitated by providing openings 57 in the pedestal support 26 for air flow. This simple design reliably and effectively accomplishes all the state transitions described in the two-bowl method above (FIG. 2). Any suitable mechanical fittings can be used to facilitate a removable unitary bowl, with reliable replacing. Mating notches and tabs can be provided, or a central socket in the bowl portion, into which the end of the pedestal fits. The socket can be blind-ended, or open the whole way through from one concave face to the other.

Figure 7C:
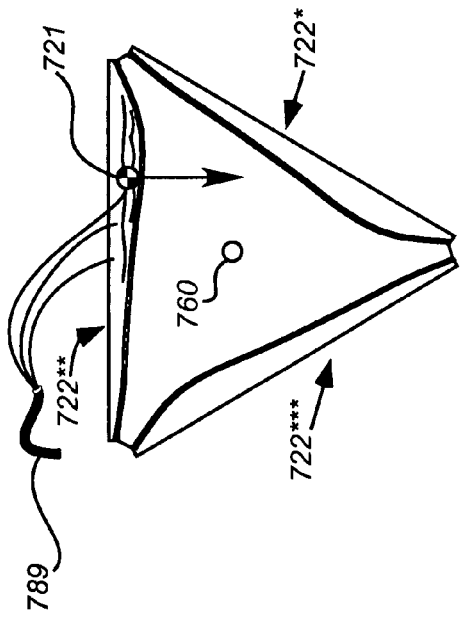
FIGS. 7A-7C show schematically, a three-bowl birdbath apparatus, from a side view, showing (FIG. 7A) a full bowl (FIG. 7B) emptying and rotating and (FIG. 7C) the next bowl being filled.
Figure 7B:
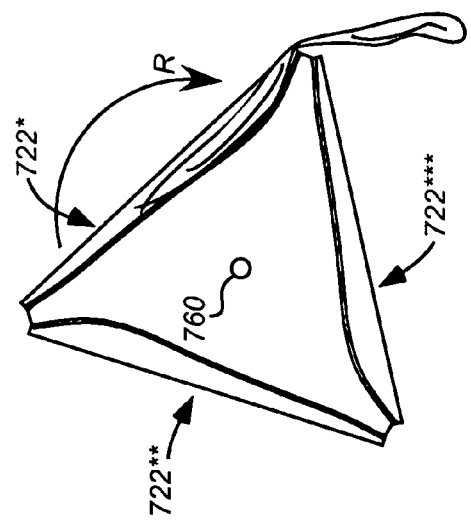
Figure 7A:
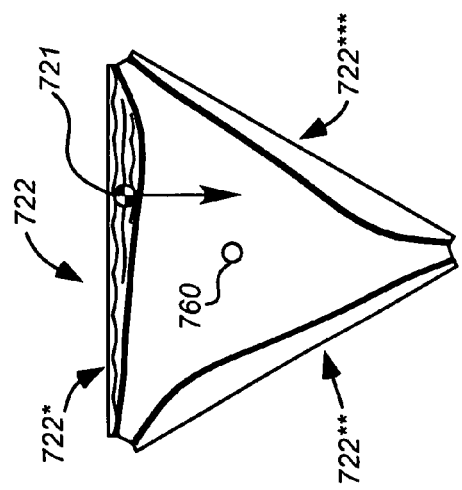

FIGS. 7A, 7B and 7C show schematically, in a cross-section, a three-way bowl apparatus, in which each of the three bowls 722\*, **722\*\*, 722\*\*\* is offset from each other in a one-hundred-twenty degree triangular orientation. This geometry provides increased drying time for the two bowls 722\*\*, 722\*\*\* that are not in use. This and similar geometries can readily be extended to any number of bowls. The bowls face away from an axis, around which they rotate. This geometry also facilitates a relatively simple mechanism for bringing the next bowl 722\*\*** to upright.

The assembly is mounted on an axle 760, allowing rotation in the direction shown with the arrow R. The bowls are shaped and placed such that each respective center of gravity 721, even with the top bowl only partially filled, is laterally offset from being directly above the axle 760, about which the bowls rotate. As shown, each bowl 722\*, etc., is deeper at the end that will fall when the assembly of bowls rotates. This will cause the assembly 722 of bowls to rotate, when a catch is released.

Figure 8C:
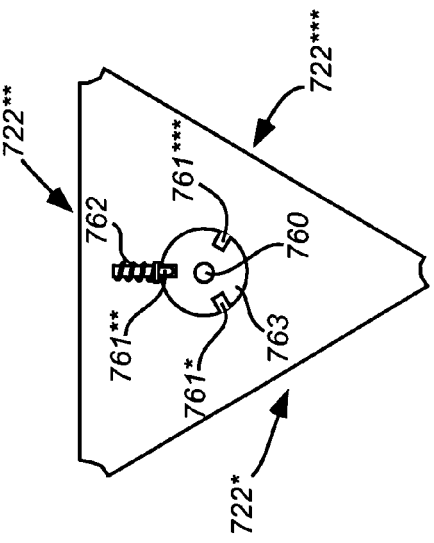
FIGS. 8A-8C show schematically a side view of a three-bowl apparatus with a catch mechanism, where the FIGS. 8A, 8B and 8C corresponding in time to the state of the bowls shown in FIGS. 7A, 7B and 7C, respectively.
Figure 8B:
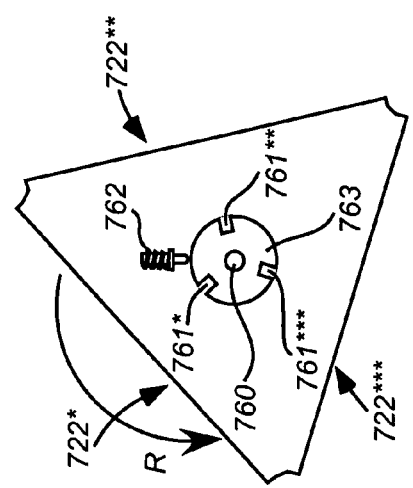
Figure 8A:
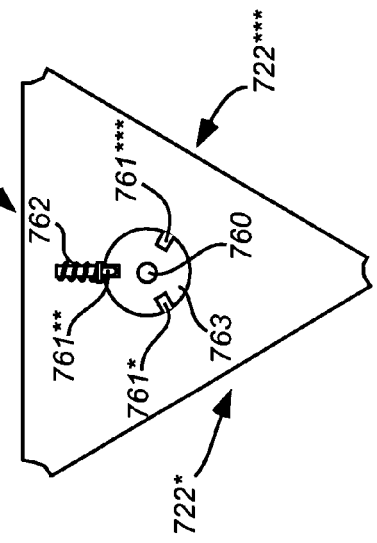

FIGS. 8A, 8B and 8C show a generic catch. (FIGS. 8A, 8B and 8C are shown from the opposite end of the axle 760 as are FIGS. 7A, 7B and 7C, respectively.) A spring loaded pin 762 fits within a slot 761\* of a plate 763, to prevent rotation of the bowl assembly 722. The pin 762 is withdrawn by a mechanism that is not shown, when it is time for the bowls to advance. When the pin 762 is withdrawn, the entire three bowl assembly 722 rotates in the direction of the arrow R, with enough momentum to bring the next bowl **722\*\* into the upright position. The pin is urged to return to its stopping position, by action of the spring, into the slot 761\*\* that corresponds to the next bowl, 722\*\*, and stops the three-bowl assembly from continuing in its rotation in the direction R. Then, the currently upright bowl 722\*\* is filled through a conduit 789 and made available for use, and the others 722\* and 722\*\*\*** are in position to dry out.

The three bowl assembly is symmetrical around the axle 760, so that when the next bowl **722\*\* is upright and filled, the center of gravity 721 of the assembly 722 remains positioned as shown in FIG. 7**A, and thus, when the pin is withdrawn again, after a predetermined time, the entire bowl assembly again rotates in the direction of the arrow R.

Rather than a spring loaded latch, the catch can be any suitable mechanism, including a cam and cam follower mechanism, which may itself be spring loaded.

Figure 9A:
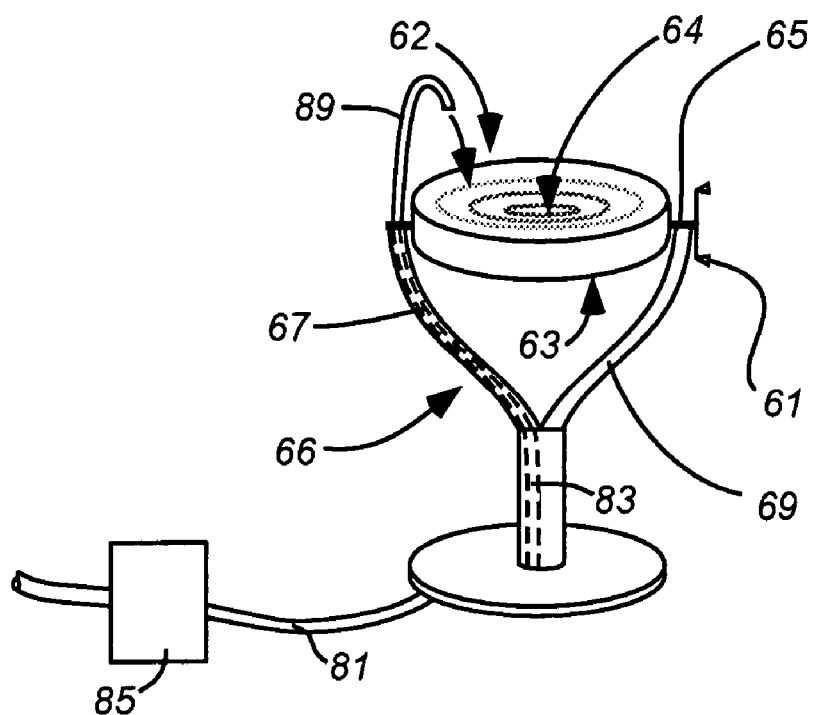
FIG. 9A shows schematically, a two-faced bowl, such as shown in FIG. 6, mounted in a pedestal having a yoke through which the bowl can pass to flip.

The three bowls can be supported cantilevered from a pedestal, for instance as shown in FIG. 5B, with the axle 760 coinciding with axis A of FIG. 5B. Or, it could be supported by a pedestal having a yoke, as shown in FIG. 9A, or by any other suitable support.

Rather than three bowls, any plurality of bowls can be used, including two, four or five, which are expected to be the most common. In either case, the bowls are shaped so that they can be arranged with a combined center of gravity that is offset laterally from the axle around which they rotate. For instance, if more than three bowls are to be used, the plan shown in FIG. 7A is simply expanded such that the four or five, or more bowls of roughly the same shape as shown in FIG. 7A are distributed around the perimeter evenly. If two bowls are used, they each have a deeper section and a shallower section, or their masses are distributed such that they are heavier toward one edge, and they are placed back to back. The same result will occur, as occurs with three bowls, as discussed above.

Pedestal Orientations

Pedestal orientations can likewise be in one of many forms and variations. FIG. 5B shows a single offset pedestal 126. The pedestal 126 is completely to one side of the bowls 122\* and **122\*\*. FIG. 6 shows a single center pedestal 26**.

FIG. 9A shows, schematically, a yoke pedestal 66 in which the pedestal is split into two branches 67 and 69 and attaches to the bowl structure 62 on opposite ends of its outer diameter. An axle 65 supports the bowl, allowing the bowl to rotate around the axle. Either bowl face 64 or 63 can be arranged concave facing upward. A crank 61 is provided to facilitate manually flipping the bowl 62.

Figure 9B:
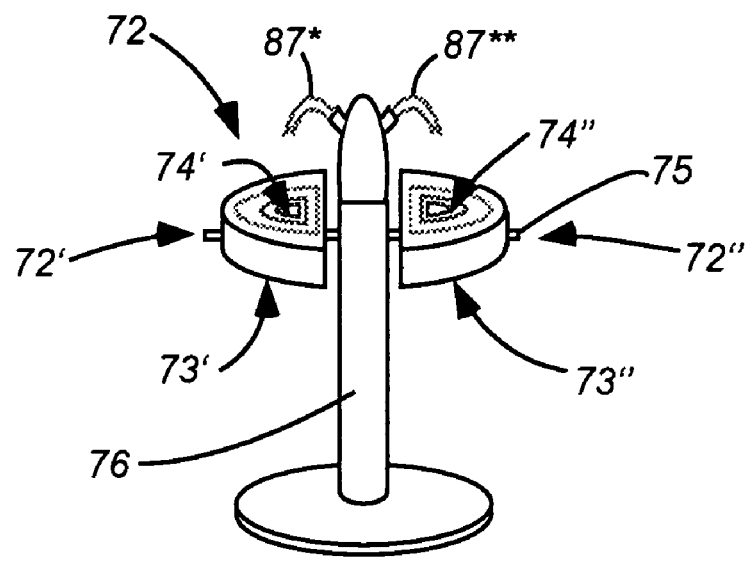
FIG. 9B shows schematically a split two-faced bowl, having four modules, split to allow flipping of the split bowl past a pedestal.

FIG. 9B shows a single center pedestal 76 with the bowl structure 72 split through the center of one of its axes at the point of attachment to the pedestal 76. The bowl halves 72' and 72" each have back-to-back facing bowls, with corresponding bowls 74' and 74", which are both shown concave facing upward, and 73' and 73", which are both shown concave facing downward. They are arranged on an axle 75, analogous to the mounting of the bowl 62 in FIG. 9A. A handle can also be provided, but is not shown. The two halves 72' and 72" can be mounted so that they rotate together, thus providing two semi-circular bowls that are full at the same time, and drying at the same time. However, they could be decoupled, so that each bowl is filled and emptied at a different time, thus providing a four bowl series, with overlapping but staggered periods of being in use and drying.

Basically, FIG. 9A shows an embodiment where the pedestal is designed to make way for the bowl to pass through it and FIG. 9B shows an embodiment having a bowl that is designed to make way for the pedestal to pass through it.

Bowl Shaft that Swings Around End

The foregoing has described two-faced bowls that are coupled to a shaft such that they switch position when the shaft rotates around its axis of elongation. As shown schematically with reference to FIG. 12, it is also possible to couple a pair of bowls 520 to a shaft 563 that rotates about an axis A through one of its ends 527, which axis A is perpendicular to the shaft's axis E of elongation. The return can either be in reverse of the initial swing, or a continuation in the same direction for an additional 180 degrees. This configuration would typically require much more power than an embodiment where the shaft rotates around its long axis, due to the longer lever arm through which the mass of the bowls and contained water is carried.

Bowl Emptying and Advancing Actions

Typically, a bowl is emptied, and another bowl is advanced into position for use. A very advantageous method to do this is to have a compound bowl assembly, that flips from one bowl to the next. Bowl flipping action, if present, can be manual (non-automated), semi-automated or fully-automated. Typically, there must be some way to provide for clearance between the bowl, and its support. Either can be split, as shown in FIGS. 9A and 9B. Or, they can be translated, relative to each other.

FIG. 6 shows a lift and flip action. These actions can be either manual, or automated, semi, or fully-automated.

FIGS. 11A-11G show an embodiment where the bowls tilt up, spin and tilt down to return. A bowl 1122 has two sides, * and ** (star and double star). A support 1126 tips the bowl 1122 up around an axis T, until a diameter D is nearly vertical, or vertical (FIG. 11C). The tipping action tips the diameter of the bowl up, essentially around an axis T that passes through one of its ends. The bowl is then spun (FIG. 11D) around the diameter D, which is at the time, vertical so that the originally concave upward side * is now facing back toward the support 1126. The bowl 1122 is then tilted back downward (FIG. 11E and 11F) in a reversal of the tilting up action, such that the originally concave facing downward side  is now facing upward. Surface  is dry and ready to be filled for use.

To return the originally concave facing upward side * to concave facing upward, the motions are reversed, with the bowl 1122 spinning in the opposite direction from that it was originally spun. Alternatively, the mechanism can always spin in the same direction. Such a mechanism can be relatively straightforward (developed along well-known principles), but would likely includes many parts. One such embodiment is discussed in more detail below, in connection with FIGS. 19 and 20A-20D. Advantages of this embodiment are that the bowl does not require a yoke pedestal, or a split bowl. It can be used for a bath or bowl that is essentially supported on the ground and has a relatively low profile.

The actions are described above as serial. First the bowl tips up, about one end, then it spins around a diameter. It is also possible that these two actions occur simultaneously. The bowl rotates around a diameter while it tips up (as discussed in connection with FIG. 22 below). It is also possible for the bowl to continue to rotate as it tips down. Such an embodiment is discussed below, in connection with FIG. 12.

Filling Actions

Figure 10A:
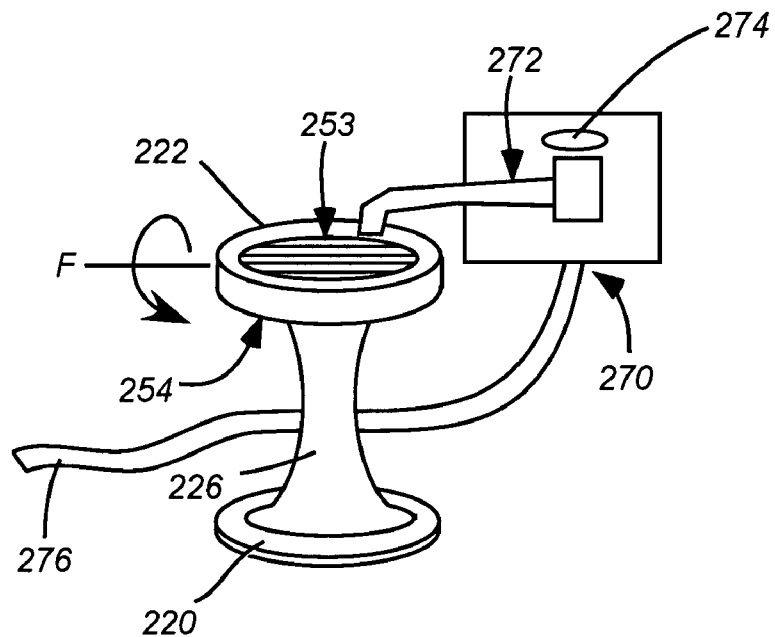
FIG. 10A shows schematically a set up allowing manually flipping a two-faced bowl.

Before a dried-out bowl can be used again, it must be filled. Filling action can also be manual, semi-automated or fully-automated. FIG. 10A shows a semi-automated filling action. A hose attachment 270, with a simple faucet or nozzle fixture 272, is located conveniently above the deployed, in-use bowl. The two-faced bowl 222 may be flipped around its horizontal axis, as indicated by the arrow F, to alternate between a first bowl 253 and a second bowl 254. Water is supplied from a supply hose 276. (The embodiment shown is generic, and the geometry that allows flipping is not shown. Some accommodation like a yoke, or a split bowl, as shown in FIGS. 9A or 9B respectively, must be provided).

Figure 10B:
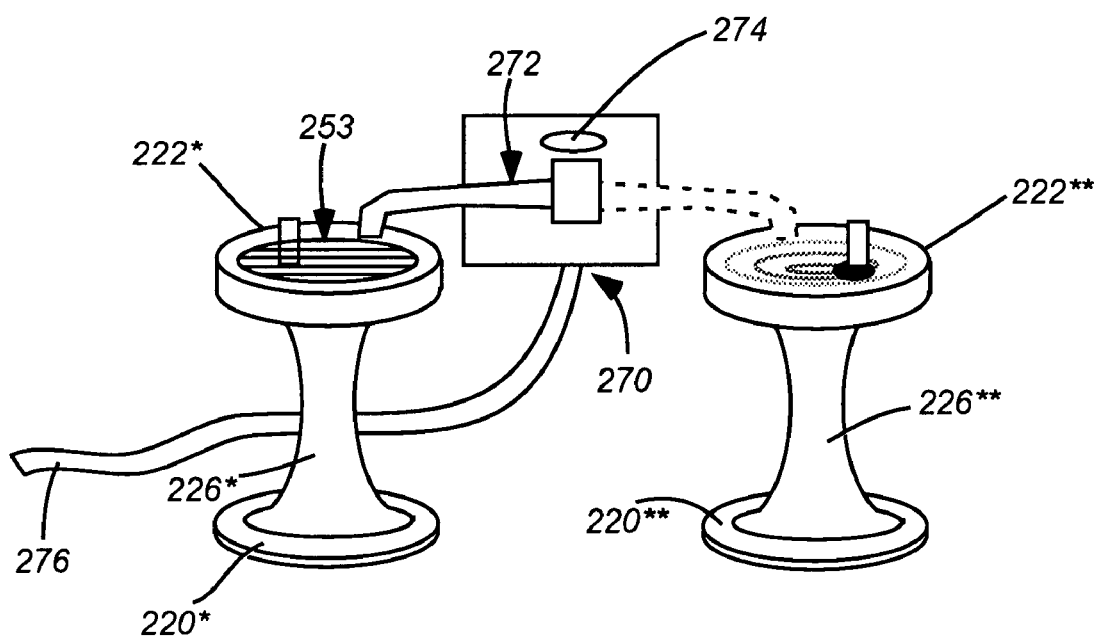
FIG. 10B shows schematically a set up allowing manually flipping a water source from a first bowl to a second bowl, to simplify emptying and filling two bowls.

Alternatively, as shown in FIG. 10B, two independent bowls 222* (left hand side) and 222** (right hand side) can be used. The bowls can drained or emptied by flipping them. The faucet nozzle 272 can swing on a hinge from one bowl 222* to the other 222**, as shown by phantom lines.

After the bowl flipping (FIG. 10A) or nozzle swinging (FIG. 10B) action has been completed, the operator simply turns on the faucet 274 to fill the appropriate bowl. In effect, a hose 276 is connected to the birdbath and turns it into a faucet extension.

FIG. 5A shows a semi-automated embodiment that takes advantage of the pedestal 46 as a support and hiding place for water supply plumbing. A fitting 71 connects to a water source (not shown). Water is provided to the fitting, either manually or through a timer device, 71, from which it passes up through a conduit 77 (shown in phantom) within the pedestal housing, and out through a nozzle 79* at the top of the pedestal and then into the waiting bowl 72*. There is also a nozzle 79 provided for the other bowl 72 when it is in place. When the bowl 72** is not deployed, the spouting water arcs harmlessly over it. Alternatively, a valve can be coupled with each nozzle 79* and 79** that blocks the supply water from reaching the drying bowl.

FIG. 9A shows a similar arrangement where water is supplied through a hose 81, up through a conduit 83 (shown in phantom) within the pedestal base and arm 67, and out through a nozzle 89. A controller 85, such as a conventional garden timer, can be used to provide semi-automated filling. If a mechanism is provided to flip the bowl automatically, then the entire process is automated.

Automation

The foregoing described emptying, flipping (advancing) and filling actions are all advantageous in adding to the process of preventing and removing adhered contaminants, thereby keeping birdbath bowls clean. They are relatively reliable, inexpensive, can be aesthetically pleasing, simple and easy to operate. However, unless automated, they all depend on user interaction. Further, the operator must be physically present. None of these possible actions will provide the desired sanitary advantages if the operator forgets, is absent, infirm, or otherwise unable to physically empty the bowl(s). Flipping is a specific action, that both empties a full bowl, and advances an empty bowl to a position for use. That may be as the result of turning over a two-face bowl, or rotating through a section of a bowl having three or more faces.

Therefore, full automation of the emptying, flipping and filling action is desirable and has advantages beyond ease of use. Automatic flipping action ensures dependable, reliable and regular drying. The automated flipping action must be able to rotate the bowl structure and recognize the position to stop when the dry, soon to be filled bowl, is in a level position. The throw of the actuator used to perform the flip should not need to be precise to make it work reliably.

The source of power for the bowl flipping action can be either electric, hydraulic, pneumatic, any other suitable source, or a combination thereof. Electric options include, but are not limited to, a motor powered by a battery or other D/C source such as solar cells, or a standard home voltage level A/C power line. Safety for the operator must be ensured with all electrically powered options. Hydraulic power options use the water pressure in the water supply line connected to the bath to provide the flipping action. House water power is particularly attractive for driving the bowl emptying action, because it is also needed to replenish the bowl. Also, it is relatively powerful, inexpensive, safe, environmentally benign, and robust.

Specific embodiments that perform bowl flipping automatically are discussed below, along with the general principles that they illustrate.

Timing Control Of Flipping and Filling Actions

A fully-automated embodiment of a birdbath must provide automatic control mechanisms for transitioning to each of the states described in FIG. 2. The control mechanisms determine the frequency of the state transitions and the duration each bowl is maintained in each state. This translates into the timings of emptying a bowl and filling a replacement bowl.

The time for state transitions could be determined either via timers, or via sensors and actuators, or combinations thereof. A design that provides these control mechanisms fully via hydraulic methods is possible and is explained below. Likewise, control mechanisms fully via mechanical methods are possible. However, some kind of electronic controller is typically desirable for at least some of the control actions. Any such electronic controller could be battery, house line, solar powered or combination thereof, and could be located local to the birdbath, or distant from the birdbath, either external or internal to the nearest building structure or integral with or separate from other components of the bowl support and manipulation structure. Such a controller is described below, after description of additional embodiments. The controller can also be incorporated into the pedestal, or other support structure of the apparatus.

Cam Assembly Simultaneous Lift and Flip Apparatus

A particularly useful embodiment is shown with reference to FIGS. 13, 14A-14G, and 15A-15E. It will reliably flip a two-sided bowl and will not get hung up midway through the process. In summary, the apparatus uses a linear piston actuating a bell crank to rotate an axle that flips a two-faced bowl. The bell crank needs to rotate the axle through only a little more than 90°, after which the bowl continues to rotate, while the bell crank remains still. A one-way clutch couples the bell crank to the axle. A cam assembly, such as a roller cam or sliding cam assembly, provides stability at only two rotational positions, and introduces instability everywhere else, so that after the rotation through slightly more than 90°, the axle continues to rotate until it stops at one of the two stable positions.

Figure 13:
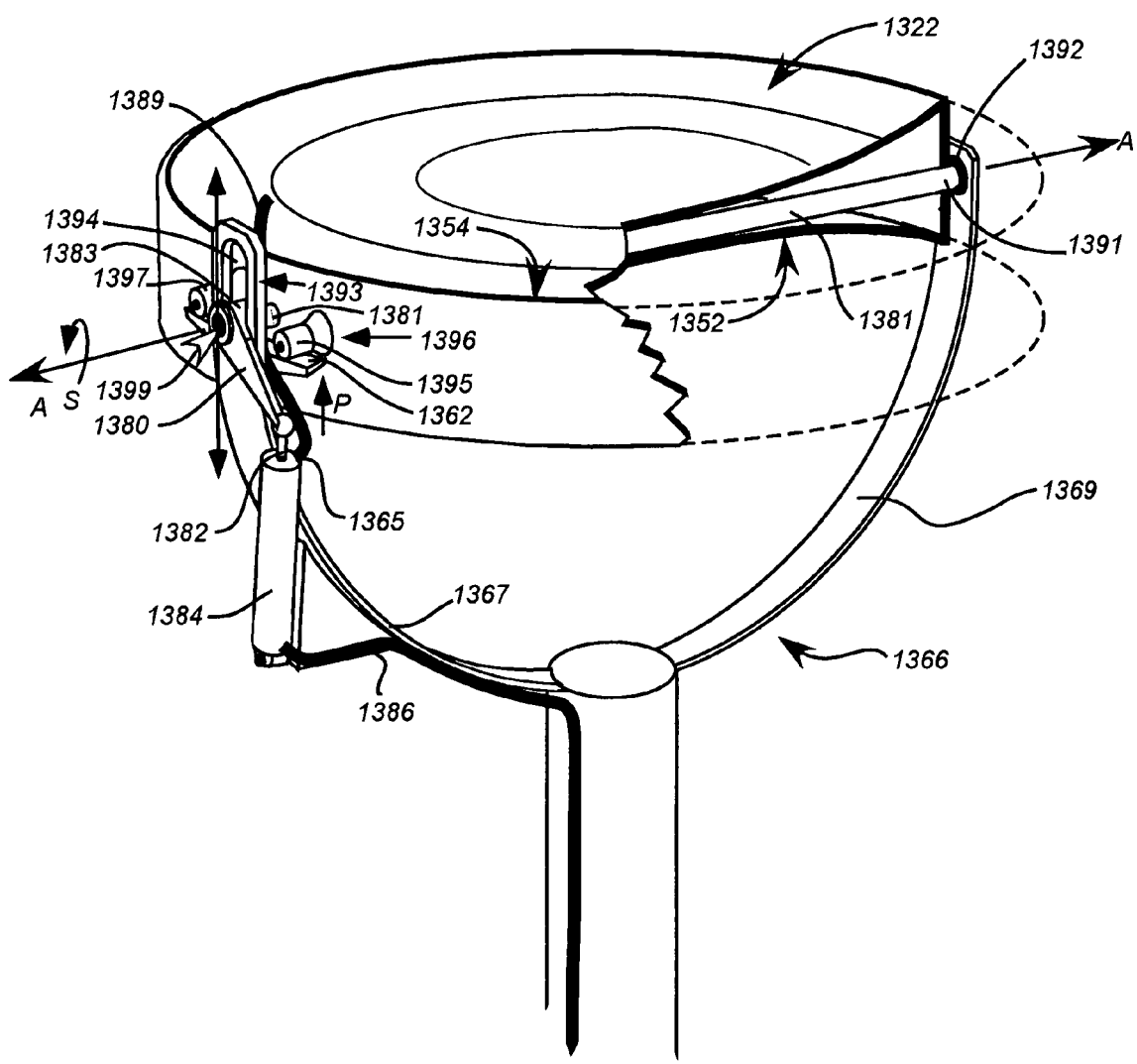
FIG. 13 shows, schematically, in a perspective view a fully automated apparatus that lifts and flips a two-faced bowl and returns it to be ready for use, with a cam bearing assembly, located on the same end of an axle as a piston.

The initial discussion refers specifically to FIG. 13, which is a perspective view with the double-faced bowl in partial cross-section. It may be helpful to also refer, at this time, to FIGS. 14A-14G and 15A-15E, which are idealized, schematic figures. In most cases, the elements shown in FIG. 13 have reference numerals that are offset by plus one thousand from analogous elements shown in FIGS. 14A-14G and 15A-15E.

A piston rod 1382 is housed in a cylinder 1384. The piston rod is coupled to a bell crank 1380 that is coupled through a one-way clutch 1383 to an axle 1381. The three elements of cylinder, rod and crank constitute the principal components of an actuator for this embodiment. As discussed in more detail below, the clutch can also be present in other places along the drive train. A bowl assembly 1322, shown in partial cross-section, has two faces 1354 and 1352, with face 1354 shown concave facing upward. The bowl assembly is fixed to the axle to rotate with it. The axle is constrained by a linear bearing 1393, at its end near to the bell crank 1380. At the other end, distant from the bell crank, the axle is constrained in a relatively loose bearing 1392. A cam assembly 1396 having two cam followers 1395 and 1397, is fixed to rotate with the axle 1381 and the bowl assembly 1322.

The figures in the FIG. 14A-G set and the FIGS. 15A-E set show a similar embodiment, in an idealized schematic representation. A difference is that the cam bearing assembly and the piston assembly are on opposite ends of an axle, rather than on the same end. Thus, with reference to FIG. 14A, a bowl assembly 322 has two back-to-back bowls, with one bowl 354 shown concave facing upward and the other bowl 352 shown concave facing downward. The bowls are rotationally fixed to an axle 381, and are able to spin around an axis A (FIG. 12) that runs through the axle 381, but in one direction only, as indicated by the curved single headed arrow S (FIG. 14B). A one-way clutch 383 of any suitable design, is coupled through its output side to the bowl, as described below. The input side of the one-way clutch is coupled to one end of a bell crank linkage 380.

A piston rod 382, riding within a cylinder 384, is coupled to the other end of the bell crank 380. These three elements constitute the principal components of an actuator for this embodiment. The cylinder is powered through a supply line 1386, typically hydraulic, and typically water.

Returning to FIG. 13, during a power stroke, the piston rod 1382 is driven outward, in the direction of the arrow P, causing the bell crank 1380, both input and output portions of the locked one way clutch 1383 and the axle 1381 to rotate around the axis A in the direction of the arrow S. The bowl assembly 1322 is coupled to the axle and rotates around the axis A in the direction of the arrow S. Water that is retained in the concave upward facing bowl 1354 pours out of the bowl.

A relatively loose socket 1392 secures one end 1391 of the axle 1381, so that the axle can rotate around the axis A, and also so that the axle 1381 can tilt around that end 1391, for reasons explained below. The loose socket may also be described herein as a wobbly bearing. A frame 1393 provides a channel 1394 in which the other end 1399 of the axle 381 is loosely captured. The end of the axle 1381 can move linearly along the length of the channel 1394 (up and down, as shown in FIG. 13), generally perpendicular to the axis A, and also from side-to-side a small bit. Thus, the frame 1393 also provides a linear bearing for the axle 1381. The vertical freedom is needed only on one end of the bowl axle. The axle will tilt, but lift only on one end.

The bowl assembly 1322 carries a pair of protruding elements 1395 and 1397 which, together with the bowl, constitute a cam follower of a cam bearing assembly 1396.

If the protruding element is a fixed non-rotating post, then it constitutes a cam follower of a sliding cam assembly, which is forced to slide along the support plate 1362, which constitutes a cam surface. If the protruding element is an axle, around which a rolling sleeve rotates, then the rolling sleeve constitutes a cam follower of a roller cam assembly. The plate 1362 constitutes the cam surface in either case. In the following discussion, the cam assembly is referred to as a generic cam assembly, which is meant to include both roller and sliding cam assemblies, and any other suitable cam-type mechanism.

Each cam follower has two bearing regions. For fixed posts, the bearing regions are the outer semi-cylindrical surfaces that face away from each other. For rolling bearing, the bearing regions are the entire outer surface of each rolling bearing.

The piston arm 1382 extends under the pressure of the working fluid (most conveniently, water), and rotates the end of the bell crank that is attached to the piston, around the axis A, which in turn forces one-way clutch 1383, which locks and forces the axle 1381 and thus bowl assembly 1322 around the axis A, in the direction of the arrow S. Such rotation tips the bowl (into the page, as shown) to empty it. However, the axle 1381 is also linked through the bowl 1322 to the post 1397 of the dual post cam assembly 1396.

Thus, as the piston arm extends, the bowl assembly 1322 also rotates around the axis A, and the post 1395 translates toward the frame 1393 upon the support plate 1362 as the axle 1381 is forced around by the piston. The support plate 1362 under the post 1395 constrains the post such that it can't rotate around the axis A, unless at least one end of the axis A itself moves upward. Thus, the torque on the axle 1381 results in lifting one end of the axle 1381 upward, along the channel 1394 of the linear bearing 1393. As the piston arm extends, the bowl assembly is supported vertically by the post 1397 on its bearing region, and by the axle 1381, which is in turn supported by the locked one way clutch 1383, which does not permit rotation of the bowl assembly in the direction opposite to the arrow S, the crank 1380 and the piston arm 1382.

It is helpful to now consider FIGS. 14A-G and 15A-E for the remaining portion of the cycle. As mentioned above these figures depict an apparatus that is similar to that shown in FIG. 13. The major difference is that the apparatus shown in FIG. 13 has the piston and cam assembly on the same end of the axle 1381, while that shown in FIGS. 14A-G and 15A-E has them on opposite ends of the axle 381. Reference numerals in FIG. 13 (whenever possible) are offset by plus one thousand from reference numerals shown in FIGS. 14A-G and 15A-E, for similar items.

At a point, shown in FIGS. 14B and 15B, the bowl 322 is tipped to a degree that the water 390 pours out, thereby emptying the currently concave upward facing bowl 354. The bowl can be sculpted with a sort of spout or several spouts, to direct the emptied water where desired.

As shown in FIGS. 14C and 15C, the piston arm 382 extends further, until it has pushed the center of gravity of the combined bowl 322 and cam assembly 396 far enough away from a vertical line V through the axle 381, such that the combined assembly will continue to move (under the influence of gravity) in the direction of the arrow S. The assembly of components is not restrained from falling, because the one way clutch 383 slips and does not prevent rotation of the bowl assembly in the direction of the arrow S. The type of clutch schematically illustrated in FIG. 14A-14F may be referred to as an "eccentric lobe one-way clutch" shown with a pair of diametrically opposed eccentric lobes. Thus, the bowl assembly 322 is free to rotate relative to the bell crank 380 in the direction of arrow S. The bowl and cam assembly posts continue to rotate in the direction of the arrow S, until portions of the bearing regions of both cam follower posts 395 and 397 of the cam assembly are again in contact with the cam surface support plate 362 (FIG. 15E).

The reason that the combined bowl and cam assembly falls is that beyond vertical, it is all being supported by the bearing region of the lower cam follower, for instance, 395, as shown in FIG. 15C. Before the cam assembly had rotated to vertical, it was supported vertically by a combination of the cam follower 395, and the torque in the direction opposite the arrow S, provided by the locked clutch, that does not permit rotation in the direction opposite the arrow S, and the actuator, which is forcing the axle to rotate in the direction S. The combined assembly is not supported vertically by the axle 381 alone. Once the upper cam follower is sufficiently beyond vertical, the combined assembly simply falls forward in the direction that it has been pushed, causing the axle 381 to continue its rotation in the direction S.

After the bowl assembly proceeds to the next horizontal position, as shown in FIGS. 14E and 15E, the piston rod 382 and bell crank 380 also return to the starting position, by essentially reversing steps, as shown at FIGS. 14F and 14G. The one way clutch slips, as the bell crank moves in the direction opposite to the arrow S.

During the portion of the cycle that the piston rod 382 is extending, shown in FIGS. 14A, 14B and 14C, the angle between the bell crank 380 and the bowl 322 (for instance as represented by a line H that is midway between the two faces) remains constant. This is because the one-way clutch 383 locks and requires that the bowl assembly rotate with the bell crank. However, after the bowl assembly passes the vertical, as shown at FIG. 14C, the angle between the bowl and the bell crank is no longer constant. It increases until the bowl assembly stops moving because the cam followers 395 and 397 are both resting against the support cam surface 362. The one-way clutch slips and permits this relative motion. Thus, when the piston rod and bell crank return to the starting position, the one-way clutch slips and permits such motion, without disturbing the bowl position.

The one-way clutch, the axle, the bowl, and a bell crank 380, can be coupled to each other in various ways. The following is required. As the crank 380 rotates in the direction S, around axis A, it drives the bowl assembly 322 in the same direction, until the bowl assembly has rotated through approximately 90°, and a bowl diameter is approximately vertical. The bowl assembly continues to rotate beyond vertical in the direction S until it is horizontal again with the opposite concave surface facing upward. The crank 380 reverses direction and returns to its starting position, either simultaneously with the continued forward rotation of the bowls, or after they have become horizontal, or in between. Thus, the locked clutch permits the bowl to move only in direction S, relative to a stationary crank. The axle 380 can be rotationally fixed to the bowl assembly 322, in which case, the clutch couples the crank to the axle. Or, the axle 381 can be rotationally fixed to the crank 380, in which case, the clutch couples the axle to the bowl assembly.

Figure 12:
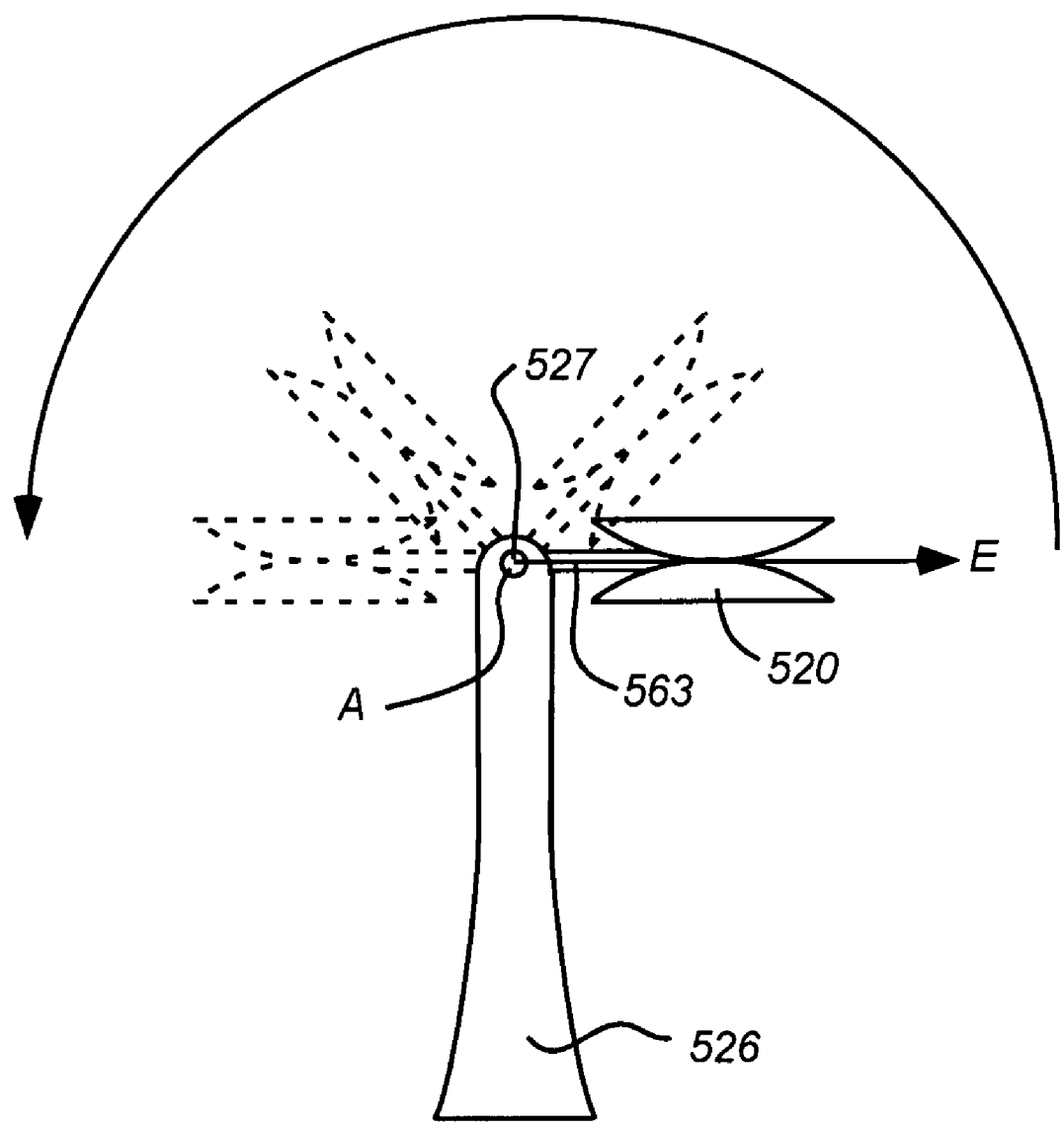
FIG. 12 is a schematic representation showing an apparatus that supports and flips a two-faced bowl at the end of a long arm.

The roller cam assembly shown in FIG. 15A is exactly analogous to the cam assembly shown in FIG. 13. There is a difference however, in that the cam assembly shown in FIG. 12 is located at the end of the axle 1381 that is near to the piston and bell crank assembly, whereas in the embodiment shown in FIG. 15A, the roller cam assembly is at the end of the axle that is distant from the piston assembly. Either is possible, and FIG. 13 is provided, in part, to show this same-sided variant. FIG. 14C and FIG. 15C, depict the same apparatus, at the same time in a cycle, from opposite ends of the axle 381. By comparing these two figures, it can be seen that one end of the axle translates up and down, in the linear bearing (shown in FIG. 15C) and the other end remains essentially fixed in the vertical direction, as shown in FIG. 14C.

Turning to FIG. 15F for a moment, FIG. 15F shows a variation of a cam follower assembly. FIG. 15F does not show another moment in the cycle, otherwise illustrated by FIGS. 15A-15E. In FIG. 15F, rather than two separate elements, the cam follower is a unitary, oblong element 2396, having bearing regions 2395 and 2397, which serve the same purpose as the posts 395 and 397. The cam follower assembly shown in FIG. 15F is in the same configuration as is the cam assembly shown in FIG. 15C.

The bearing 392 is relatively loose to allow the axle 381 to tilt away from horizontal, as the end that carries the cam follower (sliding or roller) is pushed up by the cam. The piston and crank may return immediately after the bowl has been delivered to a position from which it will continue its rotation. However, it is advantageous for them to remain fully extended while the bowl fills, as shown in FIG. 14E. An attractive place to locate a fill opening 365, shown in FIG. 14E (1365 shown in FIG. 13) is in the end of the cylinder 384. As explained below, the full travel of the piston and rod 382 uncovers a pass-through hole 365 that allows water to exit the cylinder and pass through a suitable conduit, such as a hose 389 into the concave upward facing bowl 352 FIG. 14E (1354 as shown in FIG. 13,=). At the end of the fill cycle, a deformed spring (inside cylinder 384) retracts the piston 382 such as shown in FIG. 14D and re-cocks the bell crank 380. The spring may, for instance, be inside the cylinder 384. This is possible, because when the clutch 383 slips, it allows rotation reverse of the arrow S for the bell crank, relative to the axle 381. The spring constitutes a return element. Any suitable form of return element can be used, including springs of various types (coil, torsional, leaf, etc., either extended or compressed, etc. Rather than a physical stored energy return element, such as a spring, gravity can also be used to return the bell crank to its initial position. Similarly, electronic and other forms of energy storage elements can be used, instead of mechanical.

With reference to FIG. 14E, the discharging cylinder 384 expels the working fluid. For instance, the cylinder may be slightly leaky, such that after the power stroke fills the cylinder with water as a working fluid, the water leaks out, allowing the piston to return to its relaxed, start position, as shown in FIG. 14G. In the outdoor environment, where water is being intentionally poured onto the ground to empty the bird bath, the relatively small amount of leakage from the cylinder is not a drawback. This leakage also helps to prevent freeze damage.

As is evident, as shown in FIG. 14A, before the process begins, one bowl face 354 is in use, full of water, and concave facing upward. Simultaneously, the other bowl face 352 is concave downward, and is drying out. After the piston extension and bowl fall, as shown in FIG. 14E, the other bowl face 352 is now facing concave upward, and is ready to be filled from a water source 372 by any suitable means, typically automatic, as discussed below. The recently emptied bowl face 354 is now concave facing downward, and is in position to dry out.

Thus, the piston arm must push the bowl through a rotation of only slightly greater than 90°, for instance between about 91° and about 110°, preferably between about 95° and about 100°, to ensure that the center of gravity of the bowl and cam assembly is sufficiently beyond vertical to overcome any friction in the joints and between the supporting cam follower and the support cam surface plate 362, so that the whole assembly falls forward in the direction of the arrow S. The cam assembly 398, one-way clutch and support plate 362, insure that the bowl assembly goes through a repeat cycle of approximately 180°, no more (because the support plate and cam prevent over rotation); and no less (because the one-way clutch can not prevent the assembly from falling once it has passed sufficiently past vertical).

The working fluid supply 386 can be normal house water pressure, which is typically at least thirty psi (approximately 200,000 Pascals). This would be sufficient, for instance to flip a typical concrete birdbath, holding about one to three gallons of water, using a one-inch piston. In general, ample power is available for operating any likely flipping and filling mechanism.

A plastic birdbath weighs less, and would be lifted with less pressure, or a smaller piston diameter.

The clutch can be any suitable one-way clutch, such as, but not limited to, a roller locking clutch, a vane clutch, or ratchet-like clutch.

The design provides a mechanism that is stable only in two places of the cycle, each of which corresponds to one of the two bowls facing upward. The driving mechanism does not have to make an exact 180 degree move, but only requires a move of 90°, plus a small overthrow. It recognizes nominal level relatively easily, and robustly, simply due to a cam follower resting on a support after falling through its rotation. In fact, a principal reason for the cam and the linear bearing assemblies is to provide this robust, mechanism to ensure that the mechanism stops when it is substantially horizontal. Thus, there is no need for the actuator throw to be just right to stop the bowls at the level position. It is also possible to use any other mechanism that ensures rotation through approximately 180°, with a sure stop at near to horizontal, and without getting hung up.

The hydraulic driver assembly 384 and the cam assembly 396 can be on opposite ends of the axle A, as shown in FIGS. 14A and 15B. Or they can be on the same end of the axle A, as shown in FIG. 13, shown as cylinder 1384 and cam followers 1395 and 1397. Placing them on opposite ends may make the flip axis vertical movement easier to accommodate.

It is helpful in some circumstances if the cam surface 1362 is substantially horizontal at its ends, where the cam followers came to rest, and then also trough or U-shaped at its mid-span. If so, then the piston need not rise so high, because, when it is at its extreme needed to push the bowl beyond its mid-travel point, the low-position cam follower is in the trough of the cam surface. For this version, it is necessary to make sure that the falling center of gravity has enough momentum to continue the rotation.

FIG. 13 shows an axle 1381 that passes through a full diameter of the bowl assembly 1322. The axle couples the bowl assembly to the pedestal 1366, and also transmits torque from the bell crank assembly 1380 to the bowl assembly 1322. It is not necessary that there be an axle through the full diameter. Instead, the bowl can be provided with relatively short posts, aligned with each other, that extend outward. Or, one or both ends of the bowl can have sockets, into which an axially aligned, inward extending short post fixed on the pedestal fits.

The entire assembly may be supported on a pedestal 1366. The figures show an embodiment that is convenient to explain. But, for instance, the frame elements 1367, 1369 could be fashioned to simulate branches or twigs. The pedestal can be made in the form of a tree stump. The piston housing can also be fashioned to simulate branches of a tree. The arms of the pedestal yoke can form the arms of a human figure, the fingers of a large, human hand, etc. A multitude of other motifs are also possible, as a designer will appreciate.

Rather than using a linear piston coupled to a bell crank to transduce linear motion into rotary motion, a rotary actuator can be used coupled more directly to the bowl shaft. A suitable hydraulic rotary actuator is described below in connection with FIGS. 18A-18E. Alternatively, an electric motor could be coupled to the shaft. The motor must be further accommodated to rotate the shaft reliably through 180°. This can be done for instance by using a dc motor, or an ac motor with appropriate electromechanical controllers to ensure that the bowls come to rest in a horizontal position. For instance, a regular DC motor could be used with a "kill switch" that cuts the power when the bowls reach horizontal. Or, the motor can over rotate beyond 180°, but can be connected to the axle through a clutch that disengages the motor after the axle has rotated 180°. The motor would then shut off. Or, as shown, the motor could provide rotation through slightly more than 90°, beyond which a clutch would disengage the motor from the axle, allowing the bowls to advance to 180°, with the motor stopping by other control means. The designer of ordinary skill will be able to apply the principles explained herein to various configurations of power supply and transmissions.

Control and User Interface

For the birdbath to be fully automatic, the driver supply 386 (FIG. 14E) to empty and advance the bowls and the bowl water refill supply must be provided automatically from a nozzle or other source 372. The automation can be handled by use of a controller 363, with a drive supply valve (within the controller, not shown, under control of a suitably programmed programmable mechanism 367 and a port 365 in the cylinder 384, as discussed above. The mechanism can be electronic microprocessor controlled or fully mechanical (analogous to a mechanical wind-up clock, with an alarm).

An invention disclosed herein is the realization that it is very convenient for the controller to be a single valve controller, with only one cycle (on/off pair) for each corresponding bath cycle of flip, fill and rest, until the next flip. It is further convenient if the cycle can be set by a user simply setting a period between successive cycles, and then a duration for water to be on for each cycle. The apparatus inventions disclosed herein can accommodate such a convenient control scheme.

The controller can use similar components as the now common garden water timers, which have one or more cycles, having programmable starting times, durations and repeat parameters. The controller, if electronic, can be powered by house electric power, batteries, solar batteries and power, or a combination of any of the three. Although it uses similar components, the organization and relationship among the components is novel.

Figure 16:
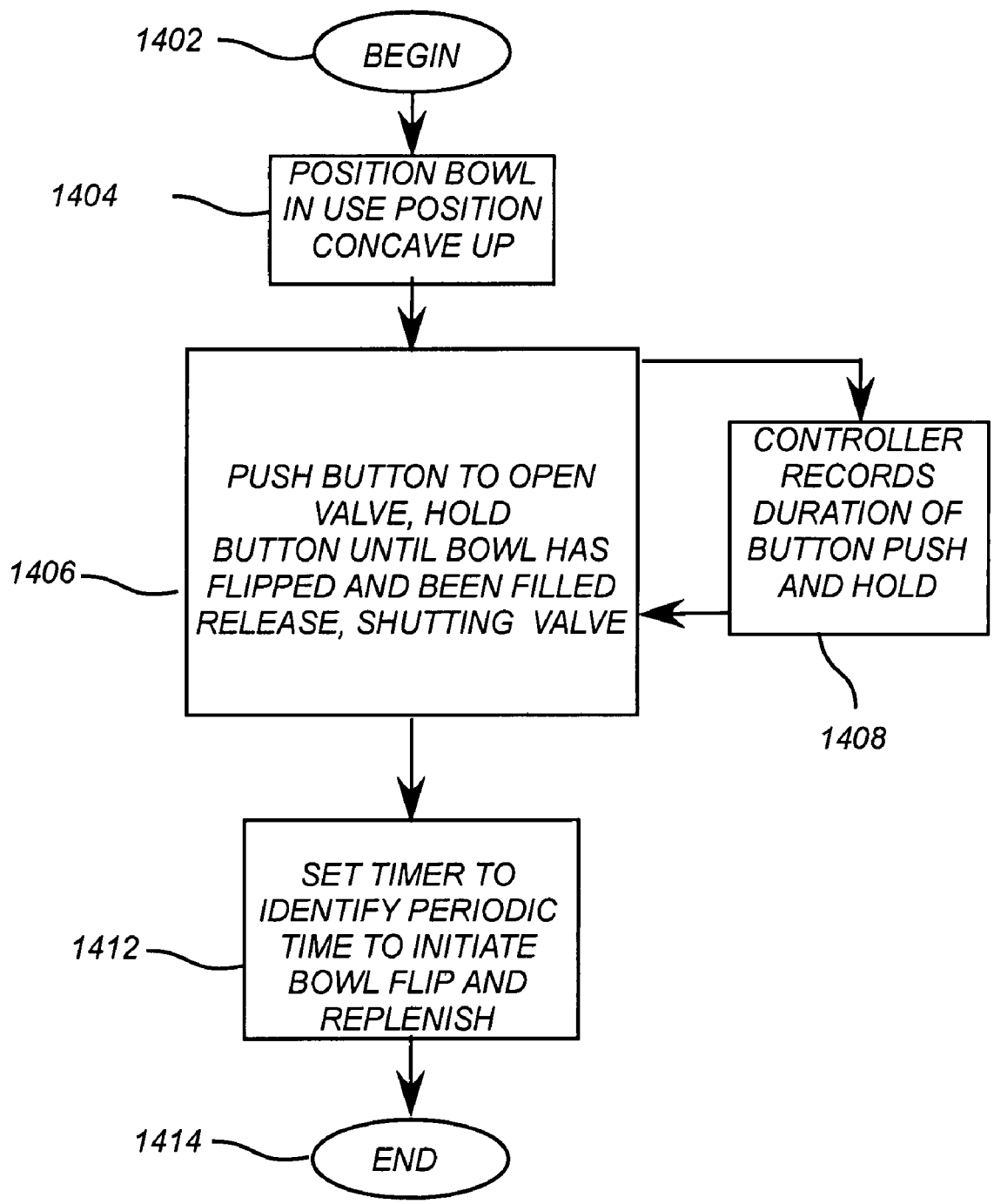
FIG. 16 shows, in flow chart form, steps that are taken in a method of setting an automated apparatus, setting flip and fill together.

FIG. 16 shows the steps of a method of setting up an apparatus such as is shown with reference to FIG. 14E, for instance, where the bowl is filled by the same water supply that drives the flipping mechanism. The user begins 1402 set-up mode and a bowl is positioned 1404 in an in-use position, concave face upward. The user presses 1406 a button and holds it, which opens a valve to flip and then fill the vessel. This begins to flip the vessel and then to fill the vessel. The user releases the button after the bowl has been flipped and filled. The controller, in set-up mode, records, or memorizes 1408 the duration of this press-and-hold. Thereafter, when the controlling program activates the dual-purpose flip and replenishment valve to open, it opens for that memorized duration, thus, relatively reliably flipping the bowl and then filling the bowl to the same level.

The user also sets 1412 a timer to identify the period of time before the bowl assembly is again flipped and emptied, and the second bowl is positioned for use and filled. For instance, every six hours, the bowl will flip and refill. Thus, each face will be full for six hours, empty for six hours, and so on, being full for two six-hour periods per 24-hour period. (The full periods need not be integer factors of 24 hours. For instance, each bowl could remain full and then empty for a five hour period.) The order that the controller and the user perform these steps is not critical. The fill duration can be set 1406 before or after the drying time duration is set 1412.

Figure 17:
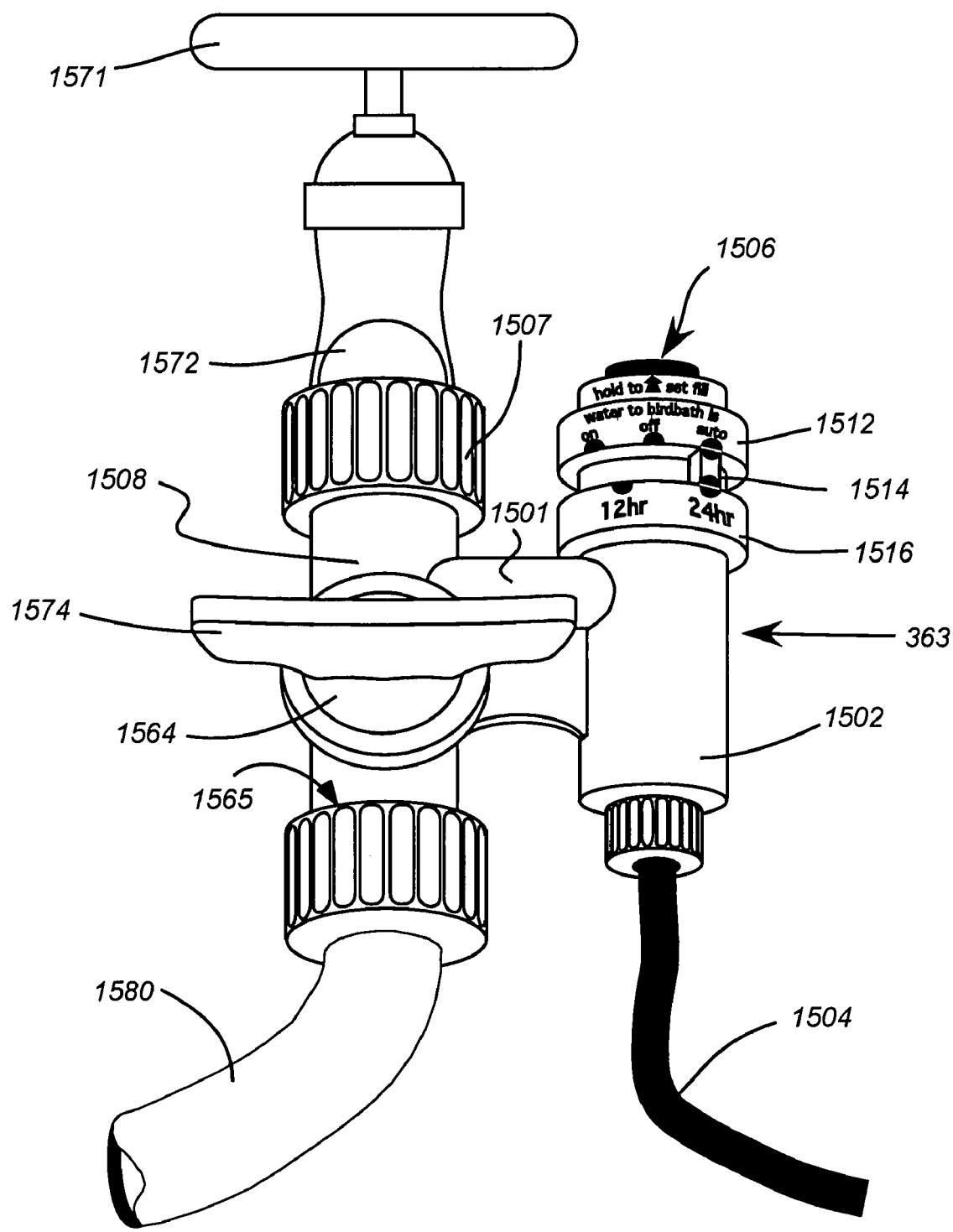
FIG. 17 shows schematically, a user interface that can be used to set an automated apparatus using the method shown in FIG. 16.

The user interface shown schematically in FIG. 17 can be used with the controller to establish the steps shown in FIG. 16. A controller 363 is housed within a housing 1502. The controller shown is electromechanical. Electrical power may be provided by batteries (within the housing 1502), or by an electrical line (not shown) coupled to house current, or from another electrical source such as a solar cell and a battery system. The controller is hydraulically coupled through a faucet fitting 1507 to the spout 272 of a faucet 274, such that water passes through a conduit 1508 through a water supply inlet 1501 into the housing 1502. The controller and its output hose 1504 are hydraulically in parallel with the standard garden hose 386. A valve (not shown) within the controller, couples the water supply inlet 1501 to the output hose 1504, as controlled by the controller, for instance, at periodic times indicated by the period indicator 1516, for a duration set by the user input by the user interface button 1506.

A faucet replacement valve 1564 is located within the conduit 1508 and is controlled by a faucet replacement handle 1574. The state of the faucet replacement valve 1564 is indicated by the orientation of the faucet replacement handle 1574, which is shown in the closed orientation. The faucet replacement handle replaces the function of the faucet handle 274, which would be lost if the controller 363 were simply placed in series with the standard faucet 272, without any faucet replacement valve 1564. Thus, the valve 1564 may be set to couple the faucet fitting 1507 though the conduit 1508 to the hose fitting 1365 and thus the garden hose 1580 and to the water supply inlet 1501 of the controller 1502 so that water may flow through both the hose 1580 and the controller 1502, in parallel, simultaneously. Water flows from the controller 1502 to the bath through the smaller diameter hose 1504. Or, the valve 1564 can be set, through the handle 1574, to couple the faucet fitting 1507 only through the water supply inlet 1501 of the controller 1502, and not through the hose fitting 1365 and the garden hose 1580.

The button 1506 is pushed and held, as described above, to initiate the set-up process and to establish the duration that the water should be provided to the flipping and filling device. The controller memorizes this duration. A mode ring 1512 selects among water to bath being: on, off, and automatic as described below. The ring 1512 rotates around an axis that is concentric with it and the main body of the controller housing 1502, to align the indicator dots with an indicator 1514 that remains fixed relative to the housing. When set to on, the water flows freely through the valve in the controller to the bath, as if the controller were not present. When set to off, the valve in the controller remains closed and water does not flow through the controller at all. When set to automatic, the valve in the controller opens and closes and water flows through the controller at periodic times, for a duration, according to the automatic schedule set in the controller to govern the flipping and filling of the bowl.

Thus, a valve within the controller is the valve that opens to provide water power to the bath, to both flip it and fill it. Closing the valve cuts off power to the bath assembly, until the controller next opens the valve. The valve is not shown, but is within the housing 1502 of the controller.

A rest cycle ring 1516 is rotated to set the duration that the controller allows one bowl to rest upright and in use, while the remaining bowl(s) are drying. The user matches the desired duration to the indicator 1514. Two possible selections, 12 hr and 24 hr are shown. However, any number of selections can be provided, such as also 6 hr and 36 hr, and these selections need not be factors of twelve or twenty-four. Of course, the more selections that are available, the more powerful the computing capacity of the controller needs to be. More selections provide the user with more flexibility in balancing the amount of time that a single bowl remains in use and that the other bowl(s) are allowed to dry.

If the user turns the main faucet handle 274 to off, then water does not reach the controller, and the bath will not fill or flip regardless of any other settings. Thus, it may be advantageous to place a marker, or an appropriate warning on the main faucet handle to remind the user of this. Or, alternatively, the handle can be removed.

If the user finds that the cycles are not preventing contaminant development, the user can lengthen the period of drying, if it does not seem that the bowl is completely drying. If it is completely drying before typically flipping, the user can reduce the period of time that the bowl remains full without emptying, thereby perhaps disrupting the growth of the contaminants. The user may also reduce the volume of the water, thereby reducing drying time, and also reduce the time during which water remains in the bowl, thereby reducing uninterrupted growth time.

The duration that water power is on, is memorized by a duration memory element of the controller. The duration memory element may be a magnetic memory, or other suitable device, including an electronic timer, a mechanical clock or an electric clock. It must simply be any device that can have a duration set in response to a user's pressing of a button (or activation of another suitable user instruction element) and releasing the button (or corresponding action of another suitable instruction element). Similarly, the periodic timing of when to turn the water on is also memorized by a suitable periodic memory element, including the same types of devices mentioned above for the duration memory element.

It is convenient if the user instruction element is a button that can be pushed, and easily held by physical pressure for the desired duration. For instance, a spring loaded button is suitable. Also possible are two position switches, such as toggles, or spring loaded detent push buttons. With these two position switches, the user must first explicitly move the button to an on position, and then return it explicitly to an off position. With a simple push button, the user must hold it in the on position. The switch does not remain there on its own.

Thus, the foregoing method of operation can accomplish periodically flipping the bowls, and then filling each one, respectively, with a single valve water supply, and a simple one cycle controller. The controller simply turns on the water once every period, for the duration desired, and the actuator and transmission automatically accomplishes the flip and fill, as described above, and also with additional embodiments discussed below.

It should be noted that the same user interface and control scheme can be used for a lawn or garden watering system, and is not limited to water bowl assemblies. For such a watering system, the two position on and off switch is preferred to the switch that must be physically held in the on position. This is because the duration for such watering activities is usually at least minutes long, and more often nearly an hour. To set such a garden watering embodiment, the user would switch it on, leave the device, and then return to set it to off. These two actions would combine to set the duration memory. The period timer would be set as with the water bowl mechanism.

Hydraulic Rotary Actuator

Any suitable actuator and transmission can be used to empty and advance and fill the bowls. The foregoing has described a bell crank and linear piston 382 and cylinder 384 driving mechanism. A rotary motor can be coupled to a bowl axle, such as shown in any of FIGS. 5B, 9A, 9B, and controlled to drive the axle around, through approximately 180°. Or, an embodiment such as shown in FIG. 13 can be used, with a rotary actuator coupled to either end of the shaft. If it is coupled to the end with the wobbly bearing 1392, then there need be no accommodation of the vertical translation of the shaft end adjacent the cam. If the actuator is coupled to the cam assembly end, then some accommodation has to be made, such as allowing the actuator to also rise and fall or by using a flexible couple.

Figure 18C:
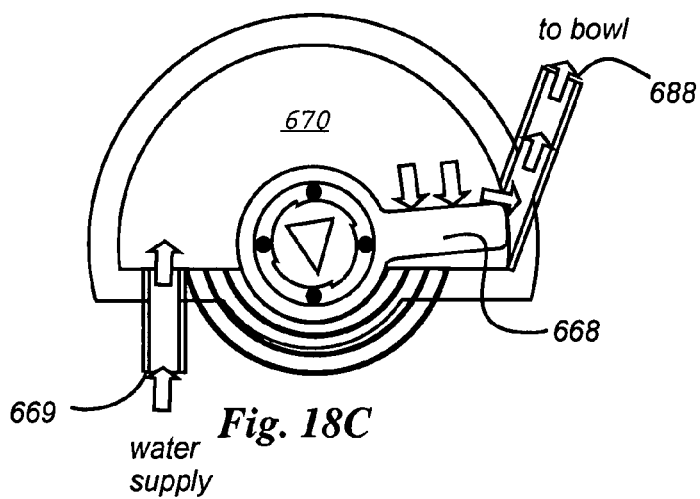
FIGS. 18A-18E show schematically, in cross-sectional view, a rotary actuator that can use water pressure to flip a two-faced bowl, having a rotary vane, with FIG. 18A showing an initial stage with no water pressure, and the axle in a first position, FIG. 18E showing the vane returning to the initial position, with no water pressure and the axle rotated through 180°, and FIGS. 18B, C and D showing intermediate stages.
Figures 18B, 18D:
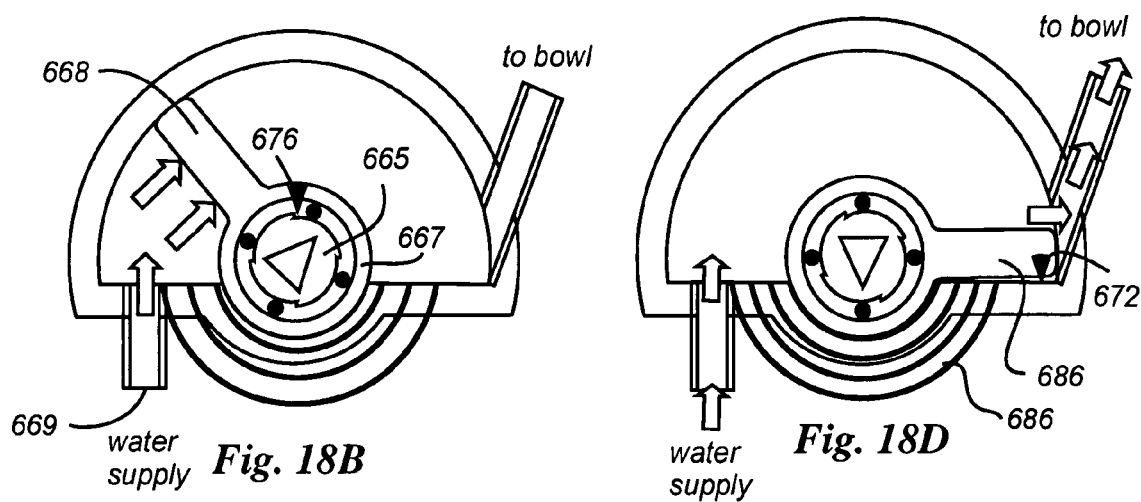
Figures 18A, 18E:
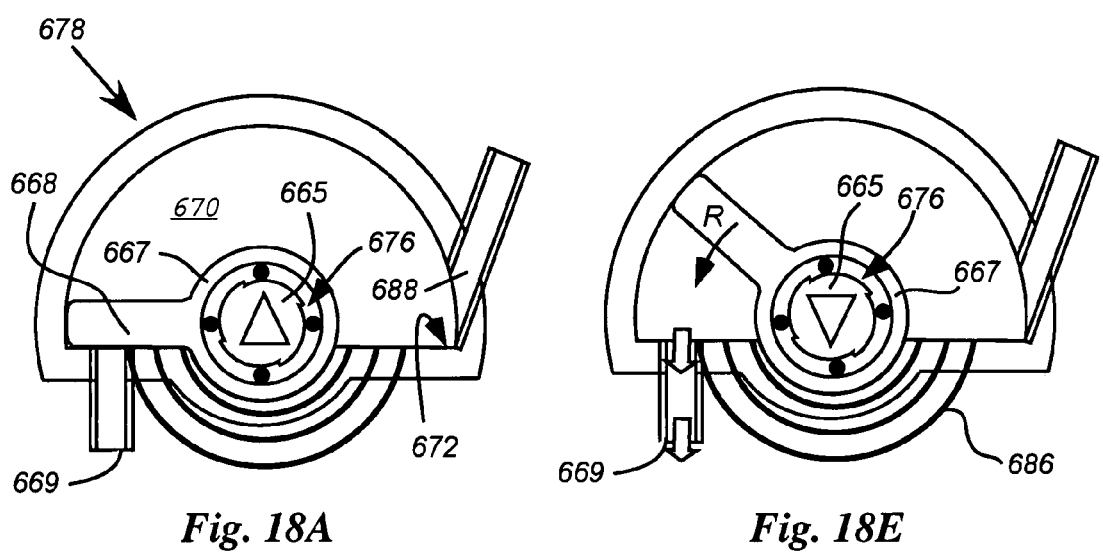

The hydraulic rotary actuator 678 shown in FIGS. 18A-18E can be used to drive a bowl assembly through approximately 180°, and with a simple modification, through the 90 plus degrees that is useful for a cam controlled embodiment as shown in FIG. 13. FIG. 18A shows a rest position, with no water pressure. A housing 678 has a semi-circular cross-section, with a semi-cylindrical open region 670 inside thereof. An axle 665 is maintained in bearings to rotate therein, as described below. The axle is coupled to a bowl assembly, such as a two-faced bowl assembly shown in any of the figures discussed above. Rotation of the axle around its axis causes rotation of the bowl assembly. In a typical, gearless arrangement, rotation of the axle through approximately 180° results in rotation of the bowl assembly from a position with a first of the bowls concave facing up, to a position with the second of the bowls concave facing up. This is indicated by the change in orientation of the triangle, from apex pointing upward (FIG. 18A) to apex pointing downward (FIGS. 18A-18E).

The axle 665 is also coupled through a one-way clutch 676 to a driving ring 667 and a vane 668. The vane is coupled to the axle 665 so that the vane can rotate around the axle through the semi-cylindrical open region 670 as shown in FIG. 18B. A water inlet 669 is coupled to a pressurized source of water, not shown, as discussed above, such as house water supply. The water inlet communicates with the open region 670. A water outlet 688 as shown in FIG. 18C also communicates with the open region 670. Operation of the actuator is discussed next.

FIG. 18A shows the actuator at rest, as it would be during the time that a bowl is in use. The figures are arranged to be viewed in sequence clockwise, starting with FIG. 18A, proceeding to 18B, 18C, 18D and 18E, because the vane 686 moves generally clockwise as the sequence proceeds. Initially, no pressure is provided at the water inlet 669. When the controller switches water pressure to the bowl assembly on, as described above, the pressurized water applies a force to the vane 668, as shown in FIG. 18B, forcing the vane around the axis that runs through the axle 665 (clockwise, as shown). The one-way clutch 676 locks in the clockwise direction, so the pressure on the vane 668 is applied through the driving ring 667 to the axle 665, also forcing the axle to rotate around the axis in the clockwise direction. As the axle 665 begins to rotate, so do the bowls (not shown) that are coupled to it.

FIG. 18C shows the situation as the water has forced the vane almost entirely through the open half-cylinder 670, approximately 180°, so that the vane 668 passes beyond the opening in half cylinder 670 wall to the outlet port 688.

Water within the open region 670 is thus permitted to flow through the outlet port, through a conduit (not shown) to fill the just flipped bowl. At the same time, the relatively high pressure water keeps the vane 668 advanced toward the end of its travel.

FIG. 18D shows the vane pressed against a travel stop 672, which permits the vane to proceed approximately 180°, but no further. It is particularly advantageous to use this type of a rotary actuator with a controller as explained above, which maintains the water source open for a memorized duration, which duration is long enough to fully flip the bowls, and then to fill the upward facing bowl the desired amount. When this time duration ends, the controller shuts off the water supply, thereby reducing the pressure within the open region 670 to ambient. A vane return spring 686 is coupled to the vane to return it to the starting position shown in FIG. 18A, and thus constitutes a return element. FIG. 18E shows the vane as it is returning in the counter-clockwise direction of arrow R, from the extreme limit of its travel, shown in FIG. 18D, back toward the starting position.

The one-way clutch 676 couples the vane to the axle 665, such that when the spring 686 forces the vane and driving ring 667 to return to the rest position, the clutch slips and the axle 665 does not return with the vane. Thus, the axle, and the now flipped bowls remain undisturbed. This is indicated by the directional triangle shown on the end of the axle 665, which remains pointing downward as it does in FIG. 18D, even as the vane returns. Note that in the starting position, shown in FIG. 18A, the triangle is pointing upward. As the vane returns to its starting position, it forces the small amount of remaining water in the open region back out the inlet port 669. A valve, not shown, downstream of this port permits the water to exit the system to the ground. The valve is the type of valve that is provided in most lawn sprinkler systems to drain under no pressure. A typical such valve is simply a leaky valve which is spring loaded open. But, the valve has enough flow resistance to be forced closed when the system is fully pressurized. When the pressure source is removed, it slowly leaks until the pressure drops a bit and allows the spring to reopen—thus draining.

The rotary actuator shown in FIGS. 18A-18E merely illustrates one way that a rotary actuator could be used with a two-faced bowl assembly. It reliably causes the bowl assembly to flip through approximately 180°, no more, and no less. Such an actuator, with a slight modification, could also be used with the cam-governed bowl assembly as shown in FIG. 13. For instance, the actuator can be coupled to the end of the shaft that is distant from the cam assembly. Rather than rotating through approximately 180°, the open portion 670 of the cylinder can occupy an arc of only approximately 100°. When the bowls have passed vertical by a sufficient degree, as discussed above, they will simply fall into position. This latter embodiment has the advantage that the throw need not be so precisely matched at 180°, and the vane need pass through only 100°.

The mechanism shown can be secured to a pedestal, so that the axle 665 is horizontal, and simply bears a double-facing bowl, as discussed above. Alternatively, the mechanism can be rotated 90°, so that the shaft is vertical, and a transmission, to which bowls are attached, can be provided to convert rotation around a vertical axis to rotation around a horizontal axis, to accomplish the flip.

Thus, this embodiment achieves a goal of providing a water powered mechanism that automatically flips a two-faced bowl at appropriate periodic times, filling the empty bowl with the same water supply. It is robust and not prone to over flipping the bowl. It can be controlled by a single valve water supply and a one-cycle controller.

Low Profile Bowl Assembly

The automated embodiment shown in FIG. 13 is most advantageously used with a pedestal. This is because as the bowl flips, it must rise high enough to clear whatever is supporting it. A pedestal can have a yoke, so that the bowl need not be lifted so high, as it would need to be lifted were it supported by a flat surface, such as the ground. Of course, a depression could be formed in the ground, thus, essentially create the geometry of a yoke, and the embodiment shown in FIG. 13 could be used fairly well. Modifications would also need to be made to the driving mechanism, or it would need to be submerged also.

As has been mentioned, there is some thought that birds are attracted to baths that have a relatively low profile relative to the ground, or are supported by only a minimal pedestal. This is because most natural baths are ground level pools, streams, puddles, etc. Thus, relatively low profile bowls are more natural. Further, as has been mentioned, a need similar to that of birdbath maintenance arises in connection with water bowls for other animals, such as dogs and cats, and some zoo and farm animals, such as pigs, sheep, goats, cows, horses and chickens. Namely, often these animal's minders leave bowls of water for the animals, when the minder is away for an extended time period. Such bowls also become rather contaminated over time. Further it would be beneficial to the animal to provide relatively fresh water, or, to replenish water that has become depleted by consumption or spilling or evaporation. Thus, a ground supported mechanism for flipping and filling a bowl has many uses.

Figure 19:
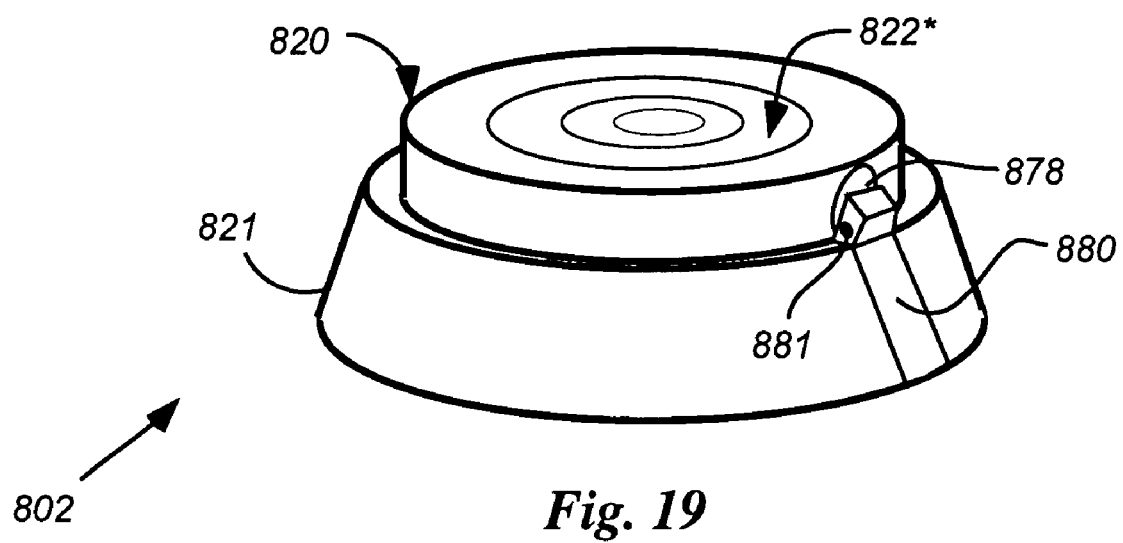
FIG. 19 is a schematic perspective rendition of an embodiment of an automatically flipping and filling bowl assembly, that is relatively low to the ground.
Figure 20B:
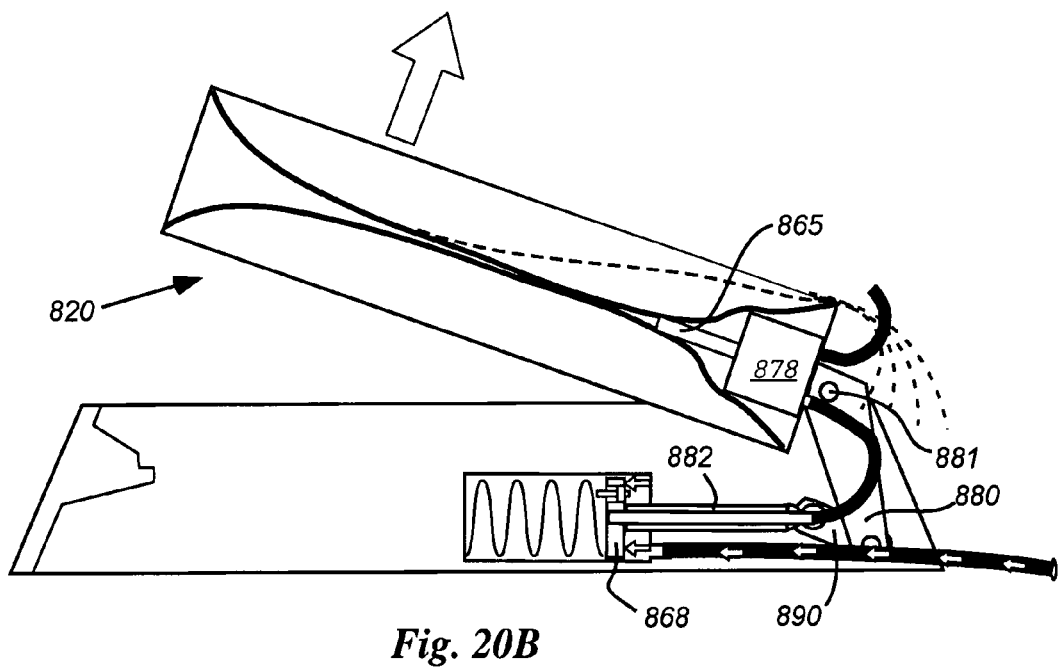
FIGS. 20A, B and D are partial schematic cross-sectional renderings of an embodiment of a low profile apparatus such as shown in FIG. 19 with a fluid supply that actuates bowl tilting and flipping in series.
FIG. 20C is a partly cross-sectional and partly perspective rendition of the embodiment shown in FIG. 19B, to show a bowl assembly rotating.
Figure 20A:
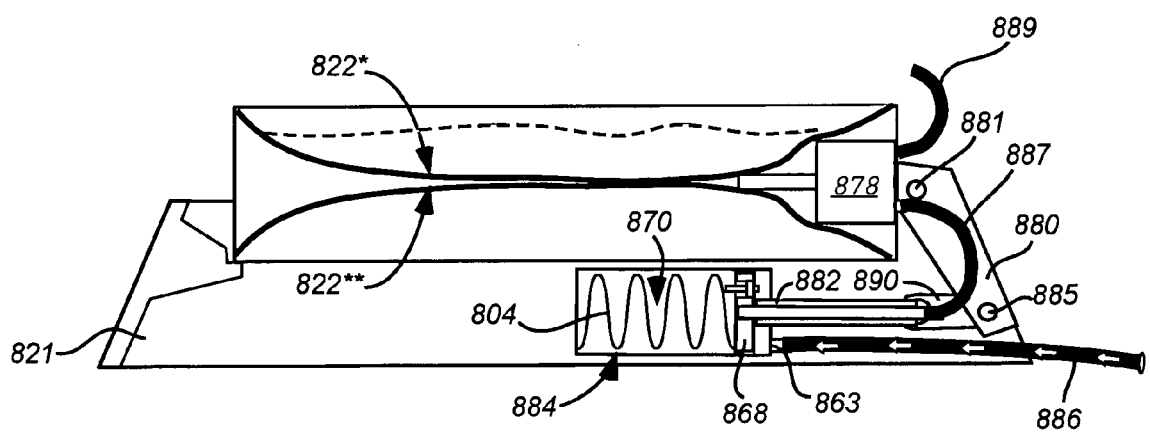
Figure 20C:
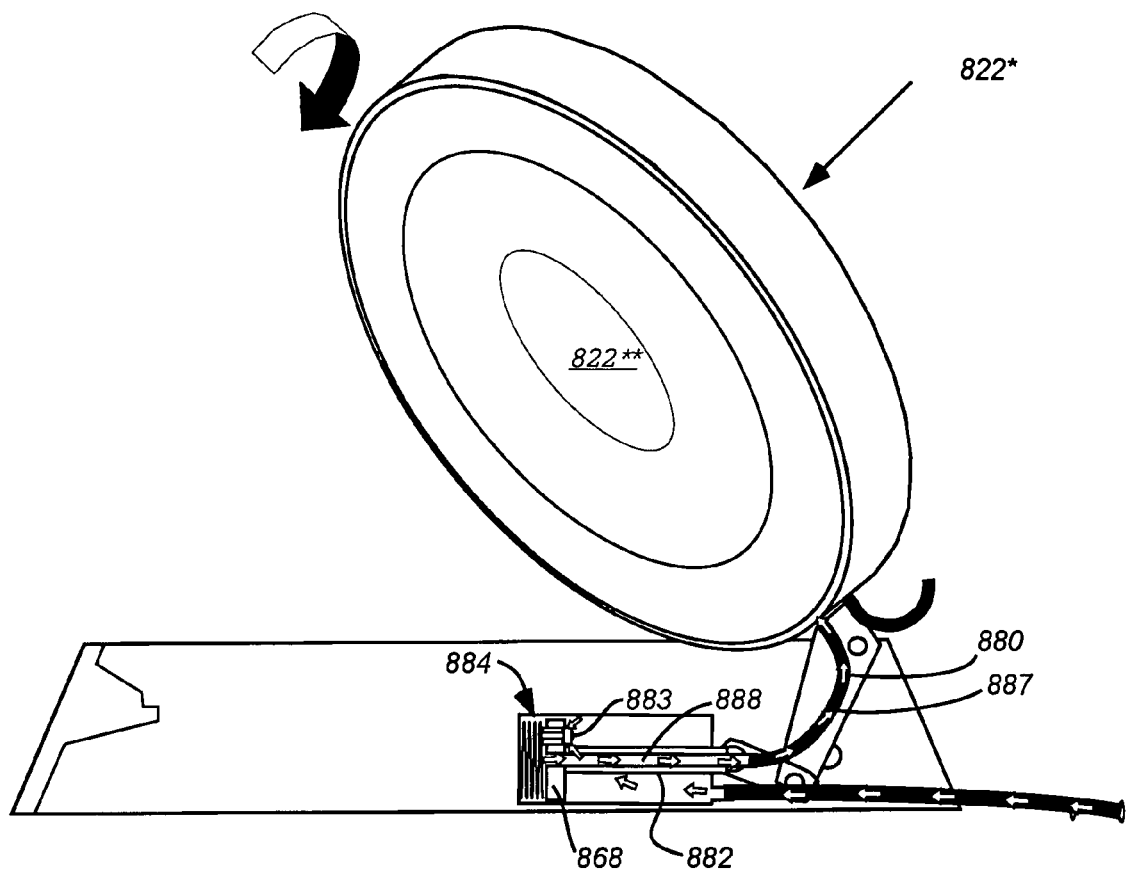
Figure 20D:
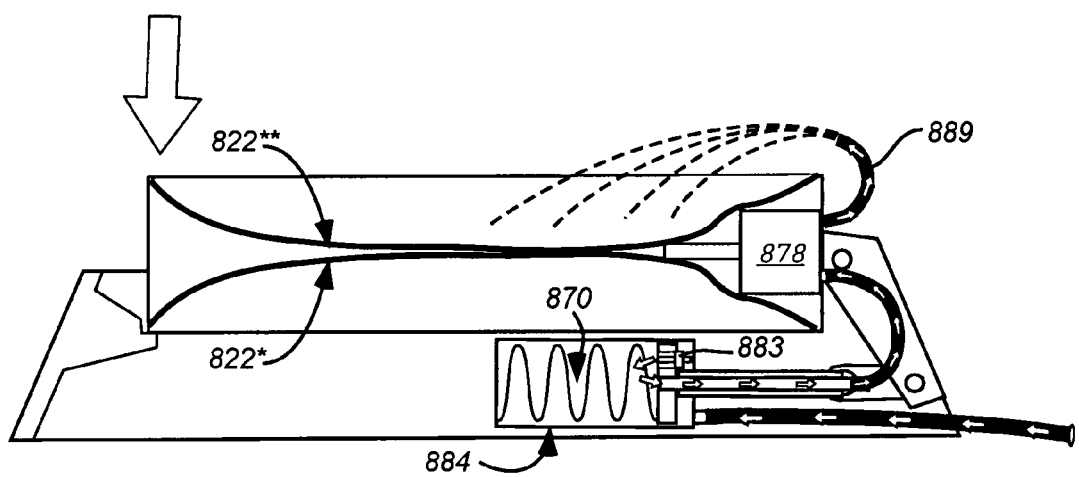
Figure 21:
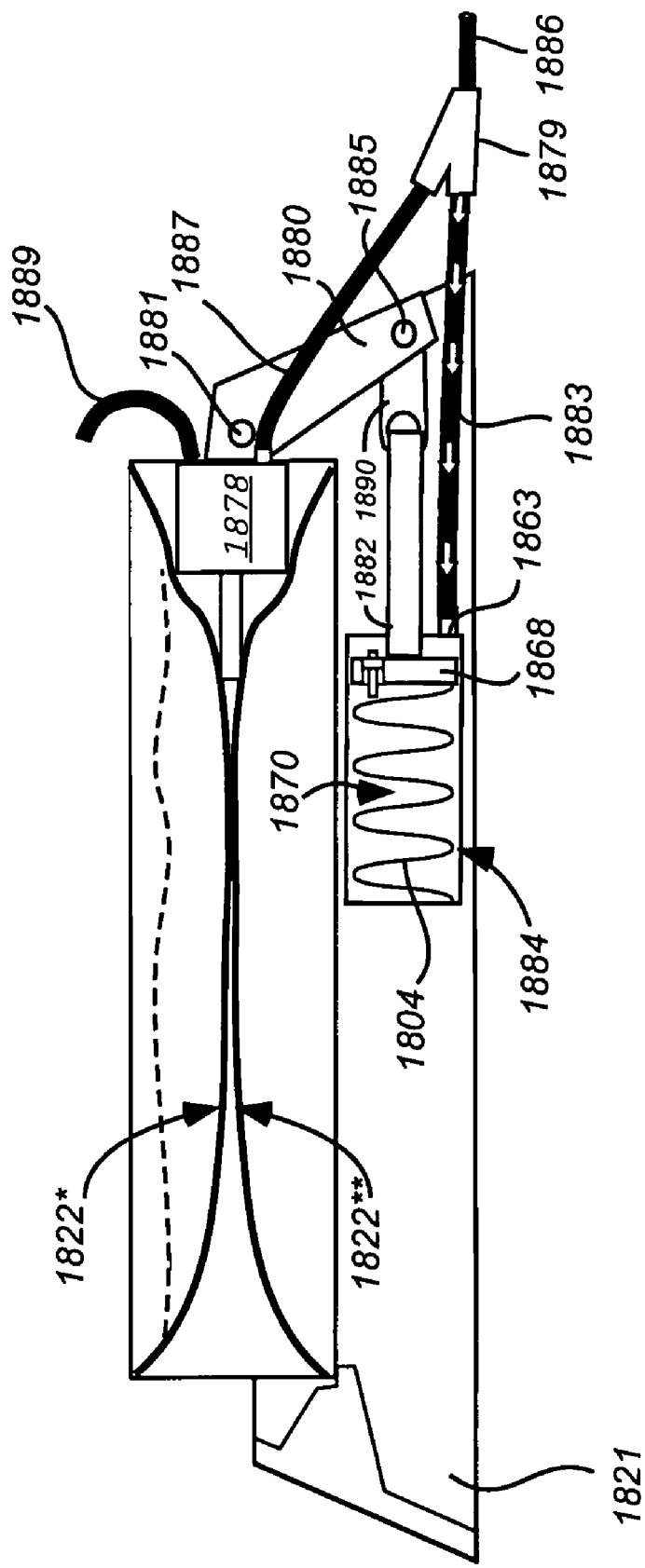
FIG. 21 is a partial schematic cross-sectional rendering of a variation of a low profile apparatus similar to the apparatus shown in FIG. 19 with a fluid supply that actuates bowl tilting and flipping in parallel.

A mechanism that can be used for such a ground supported bowl is shown with reference to FIGS. 19, 20A-D and 21. It uses a linear piston, a lever and a hydraulic rotary actuator. The apparatus 802 has a base 821 and a bowl assembly 820. The bowl assembly has a two-faced bowl, as described above, with a bowl face 822* shown concave facing upward. Face 822** is not shown, but is concave facing downward as shown in FIGS. 19, 20A and B. FIG. 19 is a schematic perspective rendition, and FIGS. 20A, B and D are partial schematic cross-sectional renderings. FIG. 20 C is partly in cross-section and partly perspective, to show a bowl rotating. FIG. 21 is of a related design discussed below.

A cylinder 884 resides within the base 821. Within the hollow interior 870 of the cylinder, travels a piston 868. A fluid coupling hose 886 couples a water supply (not shown) to the interior 870 of the cylinder through an inlet port 863. A valve 883 pierces the piston 868 and, as discussed below, at certain times, provides fluid communication across the piston from one portion of the volume 870 to another. A piston rod 882 is rigidly coupled to the piston 868. The rod 882 has a central hollow 888 which also pierces the piston 868 and communicates with the open volume 870.

The piston rod 882 is rigidly coupled to a connection arm 890, which is hinged at a hinge 885 to a lifting arm 887. The lifting arm is coupled to the base 821 through another hinge 881, about which the lifting arm rotates, as described below. The lifting arm is also rigidly coupled to a housing of a rotary actuator 878, which may be similar to that described above in connection with FIGS. 18A-18E. The rotary actuator is coupled to an axle 865, as described above, through a one-way clutch (not shown). The axle 865 is coupled directly to the bowl assembly 820, so that the bowls rotate with the axle. A conduit 889 couples the outlet of the fluid rotary actuator to the atmosphere.

Typical operation of the ground-supported embodiment is as follows. The rest configuration is shown in FIG. 19. The base 821 rests on the ground, or other planar support. The bowl assembly 820 rests within the base, relatively near to flush with the surface of the ground. One bowl surface 822* is concave facing upward, filled with water, available for use by birds or other animals. A controller as discussed above in connection with FIG. 17, controlled by the steps outlined in connection with FIG. 16, controls the bowl. It provides water at house pressure to the unit for a predetermined duration of time, which water drives the apparatus to empty the filled bowl surface 822*, flip the bowl assembly 820 to present the surface 822 for use, and fills the surface 822**** with water, and then shuts off.

FIG. 20A shows, in partial cross-section, schematically, the situation at the moment that the pressurized water is provided to the apparatus. The water enters the supply conduit 886, and passes into the cylinder 884, where it pushes the piston 868 against the return element spring 804.

As shown with reference to FIG. 20B, the piston moves within the cylinder, to the left. The piston is rigidly connected to its rod 882, which is rigidly connected to the connection arm 890. Thus, both also move in the direction that the piston moves. This motion also pulls the lifting arm 880, so that it pivots around the hinge 881. The lifting arm is rigidly coupled to the bowl assembly 820, so that the bowl assembly also rotates around the hinge 881, on the opposite side of the hinge from the lifting arm. (Thus, the lifting arm and the bowl form a lever, with the fulcrum at the hinge 881.)

As shown with reference to FIG. 20C, the piston 868 is forced further along the cylinder 884, until, eventually, it reaches the limit of its travel. At that limit, the valve 883 is opened so that the water under pressure can pass through it, from the upstream side (to the right as shown in the figures), to the downstream side of the piston), into the region where the compressed spring lies, around the face of the piston 868, and back up through a hollow central portion 888 of the rod 882. This hollow portion is coupled to a conduit 887, which is coupled to the inlet of the rotary actuator 878 (not shown in FIG. 20C). This actuator can work in the same way as the rotary actuator described above. Thus, once the water under pressure is introduced to its inlet, it begins to rotate, driving the axle around, and thus the bowls that are coupled to the axle. Thus, as shown in FIG. 20C, the bowl assembly 820 has begun to rotate around the axle, so that the previously concave facing downward face 822 will become concave facing upward. It is shown about ¼ of the way around. The lifting arm 880** only needs to lift the bowl high enough so that it has clearance above the support, to be rotated in this manner. Thus, it need not lift the bowl as high as would be necessary to set a bowl diameter to vertical. The required height depends on the geometry of the base, what cut-outs or reliefs it may have, etc.

Eventually, the rotary actuator passes through 180°, as described above, at which point the water under pressure passes entirely through the rotary actuator, exiting through a port into the bowl fill conduit 889, as shown in FIG. 20D.

This opens the entire fluid path to ambient at the extreme downstream end, such that the pressure on the rod face of the piston 868 no longer overcomes the spring and the gravity load of the bowl assembly, which together force the piston back to the rest position, shown in FIGS. 20D. (The fluid pressure on the two faces of the piston is near to equal, due to the pass through valve 883.) The pass-through valve is of any suitable self-energizing type that will remain open until the duration of the filling phase of the cycle has ended. For instance, that pass-through valve can be similar to the one described in connection with FIG. 24 below. Once the valve opens, the supply pressure is provided to the valve in opposition to the return spring until another condition triggers shut off of the supply. Such a valve remains in an open state until the supply pressure is removed.

The bowl and lifting arm also return to the rest position, but, now with the opposite face, 822 concave facing upward. Water continues to pass through the entire mechanism, including the bowl fill conduit 889, flowing into the bowl surface 822** filling it. The water shuts off after a predetermined duration, and the apparatus is ready to remain in use with the other bowl surface 822** concave facing upward, for a predetermined use duration, until the cycle begins again, as in FIG. 20**A. Water begins to flow through the bowl-fill conduit, and out its outlet, before the bowl is in place to hold water. This is not a problem, because the bowl is typically out doors where water spilled on the ground is acceptable.

As the bowl assembly has rotated with the axle, the housing of the rotary actuator has not rotated, nor have the conduit 887 that supplies it, or the bowl fill conduit 889. After the water shuts off, the actuator's moving parts return to their original resting position, under the influence of a return spring (not shown). This occurs without the return of the axle and bowl assembly to its original position because the one-way clutch slips. A suitable location for the clutch is coupling the internal structure of the rotary actuator, for instance, a vane, to the axle.

This apparatus can also be controlled by a simple controller that requires only a single command to turn water on, and, then, after a preset duration, during which time the bowls are flipped and filled, turn the water off. Several interactions are important (but not absolutely required) for this simplicity. The end of travel of the piston 868 initiates action of the rotary actuator. The end of travel of the rotary actuator starts the bowl fill. The gravity loaded piston retreats to its initial position, while the pass-through valve 883 remains open. The rotary actuator remains open, staying at the end of travel until the water pressure reduces to zero.

Thus, an embodiment of the invention shown with reference to FIGS. 19 and 20A-D can be fully automated, and driven by house water supply to flip and fill the bowls, at a period as desired by the user. The apparatus can be discretely supported level with the ground, and still conveniently flipped. It will be attractive to those birds accustomed to bathing in ground level baths.

The driving mechanism is shown for illustration only, and is not meant to be limiting. There are other ways to actuate a low profile bowl, using only hydraulic power, or using hydraulic and electric power.

Simultaneous Rotating and Lifting

A second related embodiment is shown schematically with reference to FIG. 21. This embodiment is similar, except that the flipping actuator, rotary actuator 1878, is energized in parallel (simultaneously) with the lifting actuator, piston 1868, rather than in series with (after) it. Thus, the bowl 1820 begins to rotate around the axis before it has been fully lifted. This parallel action occurs because a Y-fitting 1879 splits the flow of supply fluid from the supply conduit 1886 and directs it to both the lifting piston actuator 868 and the rotary actuator 878, simultaneously, through lift conduit 1883 and rotation conduit 1879, respectively.

One Actuator Rotating and Lifting

A third related embodiment (not shown) is very similar to that just discussed, but it has no lifting actuator or linkage, and only has a rotary actuator, such as 878. The power fluid is introduced directly from a source to a sufficiently powerful rotary actuator. As the bowl begins to rotate the point of contact between it and the ground starts at a point approximately 90° around the bowl perimeter from the actuator, and moves toward the actuator.

Forcing a point along the perimeter against an underlying support causes the bowl to tip up at that contact point. For this to happen, the bowl and actuator must be hingedly mounted to the planar support, so that the diameter can tilt upward, rotating around the hinge.

For instance, the embodiment can be similar to that as shown in FIG. 21, but without the lifting actuator 1868. The bowl is mounted to a horizontal support upon which the concave downward facing bowl directly sits. A rotary actuator similar to 1878 provides actuation. The diameter of the bowl assembly 1820 tips up around the point of contact between the bowl and the horizontal support as the bowls rotate.

In general, the low profile embodiments shown have a linear actuator where the travel of the piston is essentially horizontal. This need not be. It can be inclined. In general, the more it is inclined to horizontal, the higher will be its profile. Thus, one may, somewhat arbitrarily, consider embodiments having an actuator that travels between 0 and 45° to horizontal as a low profile embodiment, and those with the actuator between 45° to 135° to horizontal as not being low profile embodiments.

These ground level or low profile embodiments can also readily be used to maintain fresh water in pet bowls, such as for dogs, cats, etc., and to flip, empty and refill such bowls at a frequency chosen to minimize the accumulation of contamination. Similarly, for zoo and farm animals, the principles and designs shown herein can be adapted to provide fresh, uncontaminated water. The scale may need to be large enough to match the scale of the animals, and in some cases, higher pressures or other force intensification design may be required. However, these are within the skill of the designer.

Sequencing of Actuator Actions

Several general considerations obtain regarding the sequencing of actuator actions. There must be at least one actuator. One motion or its equivalent that must be actuated is to rotate a bowl around a diameter, so that a first face that is originally concave facing upward, becomes concave facing downward. For instance, the embodiment shown in FIG. 13 employs a single actuator. Other embodiments that might use a single actuator are those shown in FIGS. 7A-7C, and 23. (Some of the embodiments shown flip a bowl around a diameter, while the diameter itself also moves through space. For instance, the embodiment shown in FIG. 12, the bowl rotate around a diameter as the diameter moves in a large arc. In the embodiment shown in FIG. 7A-7C, the diameter (or equivalent, since the bowls need not be circular) moves in a circle around the central axle 760. As it does so, each individual bowl rotates around that diameter, so that its concave surface is at one time facing upward, and at another, facing downward. There are other geometric ways to describe this motion, all of which will be understood to be equivalent by the person skilled in the art.)

In general, to rotate around a diameter, clearance must exist in some way, for the bowl edges that are being exchanged with each other, to move past whatever horizontal support supports the bowl. In the embodiments shown in FIGS. 7A-7C, 12 and 13, clearance arises due to the configuration of the pedestal. For low-profile, or ground level devices, such as shown in FIGS. 11A-11G, 19, 20A-20D, 21, a more complex motion is required. (The embodiment shown in FIG. 22 (discussed below) is pedestal mounted, but the pedestal has an essentially planar flat support surface, with no yoke. Thus, for purposes of bowl flipping, the requirements are similar to those required for a ground level embodiment.)

For such planar or ground level configurations, one way to flip the bowls is illustrated with respect to FIGS. 11A-11G, as discussed above. The bowl assembly is tipped such that a bowl diameter becomes inclined relative to horizontal. When the diameter has tipped up enough to provide clearance for the edges, the bowl is rotated around the tilted diameter such that the edges most distant from the diameter exchange places. Then, the tip-up is reversed by a tip-down.

In terms of geometric symmetries, a simple reflection around a diameter (accomplished as a rotation around a diameter) is equivalent to a rotation through some angle R around a first axis, followed by a rotation through 180° around the diameter, followed by a reverse rotation through angle negative R around the first axis. Such compound motions around two axes are conveniently accomplished with two actuators. One actuates the tilting up and down of the diameter. The other actuates the rotation around the diameter.

The embodiment shown in FIG. 20A uses two actuators that operate in series: one to tip the bowl assembly 820 upward so that a diameter is inclined to horizontal, and another actuator 878 to rotate the bowls around that diameter. The similar embodiment, shown in FIG. 21 energizes the actuators in parallel, simultaneously, so that even as a first piston actuator 1868 tilts the bowl diameter upward, a second, rotary actuator 1878 rotates the bowl assembly around the diameter. The third low profile embodiment, not shown, uses a single actuator, as discussed above, so actuator sequencing is not an issue.

In general, one invention disclosed herein is that the entire process occurs under the control of a controller that periodically opens a single valve for a single duration of time. If there is a single actuator, such as the embodiment shown in FIG. 13, then the mechanical arrangement, for instance, a cam assembly, organizes the sequencing of any lifting, rotating and lowering and filling. If there are dual actuators, such as one for lifting and lowering and one for rotating, then the actuators can be in series, or in parallel, operating in sequence, or simultaneously. If in series, then the activation of a later operating actuator is conveniently triggered by a configuration of an actuator that is earlier in the series. For instance, the end of travel of a first actuator can trigger energization of a second actuator. Or, rather than the end of travel, arrival at some other point of travel, such as the midpoint. The fill function can also be triggered by passage of actuator components, such as pistons or vanes, past ports, or switches. All such triggering will require tuning and balancing of spring forces, pressures, etc.

Pedestal Mounted Simultaneous Tipping and Rotating Bowls

A pedestal mounted embodiment that illustrates a bowl assembly, a diameter of which tips up while simultaneously, flipping (rotating) the bowl around that diameter, is shown with reference to FIG. 22, FIG. 22A, FIGS. 23A-23D and FIGS. 24A and 24B.

A pedestal 426, is supported by the ground 400, or another horizontal support. The pedestal supports a bowl assembly 420, as discussed, having two bowl faces: one, 422* shown concave surface facing upward; and, back-to-back with it, another 422**, shown concave surface facing downward.

The bowl assembly 420 is coupled through a linkage to a piston assembly 404, having a piston 468, that is housed in a cylinder 484. The linkage includes a piston rod 482, coupled directly to the piston, a cable 490, coupled to the rod, which cable is trained around a pulley 452. A lifting arm 480 is coupled to the cable by a hinge. The lifting arm pivots around pivot pins 481a and 481b (not shown), which is fixed (through arms 485a and 485b) to the pedestal. Pivot pins are coaxial, and extend toward each other. Each is supported by a respective arm 485a, 485b.

The bowl assembly 420 is fixed to an axle 465, so that the bowl assembly rotates with the axle around the axle's axis of elongation. The bowl also moves with the axle 465 as the axle pivots around the split pivot pin 481a, 481b. A bevel gear pair 454, is composed of an axial gear 456 that is co-axial with the axle 465, and that is coupled to it through a one-way clutch 476. The other bevel gear segment 458, of the pair 454 is fixed to arm 485b and remains translationally fixed relative to the pedestal (and ground) when the bowl assembly tips up and rotates around an axis. The axes of the two bevel gears intersect at a point that would be the center of the pivot pin 481a, 481b if it were not split into two segments. Thus, the bevel gears intersect at a point on the axis along which the two pivot pins are aligned, which also lies inside the axle 465 of the bowl pair.

The axle 465 is supported by a bearing sleeve 463. The bearing sleeve is a hollow cylinder that is supported by the pivot pins 485a, 485b, so that the bearing sleeve pivots around them, and carries the axle 465 with it. The axle is free to rotate around its long axis, relative to the bearing sleeve 463. The bearing sleeve 463 does not rotate around the long axis of the axle.

Figure 22:
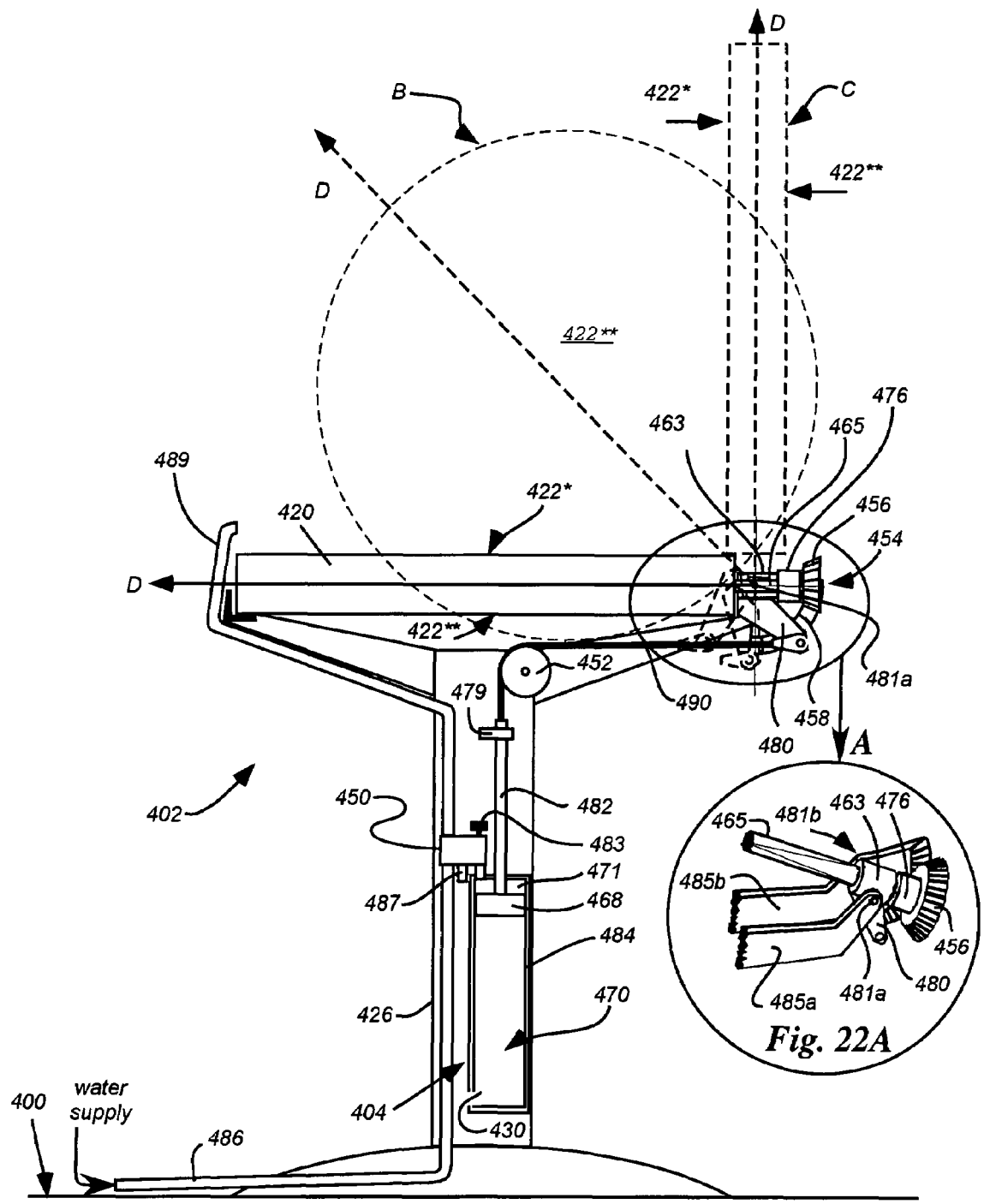
FIG. 22 is a schematic cross-sectional representation of a pedestal mounted bowl assembly that simultaneously tips upward and rotates around a diameter.

As the bowl axle 465 is caused to tilt up, pivoting around the pivot pins 481a and 481b due to the tilting of the bell crank 480 also around the pivot pins, the bevel gear 456 travels along the mating bevel gear 458, generally downward and to the left, as shown in FIG. 22. This translation drives the axial bevel gear 456 to rotate around the long axis of the axle 465. The bevel gear 456 is coupled to the bowl assembly 420 through a one way clutch 476. The one way clutch 476 is arranged with a first side coupled to the bevel gear 456 and a second side coupled to the axle 465, such that rotation of the bevel gear 456 in a first direction counter-clockwise (as seen from the right of FIG. 22) locks the clutch and causes the axle 465 to rotate in the same direction, and thus, the bowl assembly with it. But, the clutch slips when the bowls begin to descend, causing the axle 465 to tilt downward, driving the axial bevel gear in the opposite direction along its mating fixed gear portion 458 (generally back upward and to the right, as shown in FIG. 22, and rotating 476 clockwise), and thus, the axle 465 is not driven in the opposite direction (clockwise). Thus, the bowls flip on the way up, and stay flipped, as they move back down.

The sleeve 463 and the internal axle 465 and the pivot pins 481a and 481b are arranged in a gimbal fashion, so that the internal axle 465 and the sleeve pivot together around the pivot 481, but move independently in rotation around the long axis of the axle 465 and diameter D.

The cylinder 484 has an interior region divided by the piston into a piston face chamber 470 and a piston rod chamber 471, in which the piston 468 resides. A water supply conduit 486 is coupled to a water supply, and to a two-position hydraulic control valve 450, shown in detail with reference to FIGS. 24A and 24B. The control valve 450 is also coupled to a bowl-fill conduit 489, a drain 487, and to the piston rod chamber 471 of the cylinder 484. The control valve has a valve-actuating button 483. A valve trigger 479 is carried by the piston rod. When the piston rod is near to the extreme end of its travel into the cylinder, the valve trigger 479 pushes upon the valve actuating button 483.

Within the hydraulic control valve 450, the valve-actuating button is rigidly connected to a spool valve 440. The spool valve has two sliding surfaces 442 and 441, which divide a hollow chamber within the control valve 450 into two chambers, 444 and 446. The position of the spool valve and the sub-chambers, relative to the various conduits within the control valve 450 for supply 486, bowl fill 489, drain 487 and cylinder 473, determine the route that the pressurized water follows, and thus, the operation of the device, as described below. A spool valve return spring 448 is positioned to return the spool valve 440 to a rest position if no force is applied to the actuating button 483. A passage 490 hydraulically connects the bowl fill chamber 444 to a latch surface 492 of the spool valve 440.

The foregoing describes the structure of the apparatus. Its operation is described next.

Figures 23A, 23B, 23C, 23D:
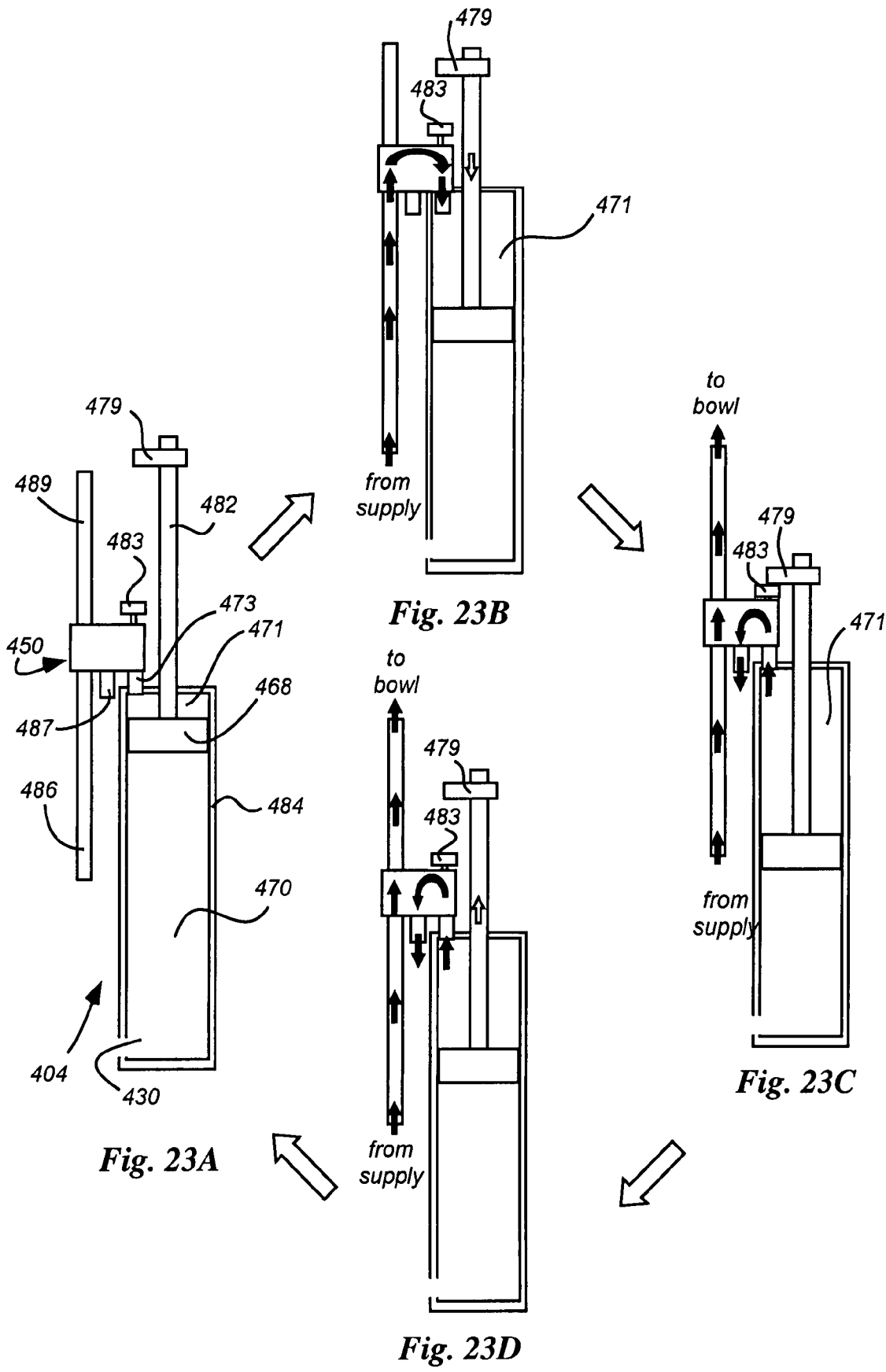
FIGS. 23A-23D are schematic cross-sectional representations of a piston and cylinder drive mechanism, suitable to drive the tipping and rotating apparatus shown in FIG. 22.

As shown in FIG. 20, the bowl assembly 420 may have one bowl surface 422* concave facing upward, at rest, and filled with water for use. This corresponds with the piston 468 at the upper end of its travel, such that the shaft chamber 471 of the cylinder is relatively small, compared to when the piston is at the other extreme of its travel. As shown in FIG. 23A, no water is supplied to the piston assembly 404 at this time.

The state of the control valve 450 is not crucial, because no water is provided to the supply conduit 486 by the controller, not shown. However, it is important that the control valve has returned to its start position when pressure is removed, so that it is ready for the next cycle. The water supply controller can be of the type described above, in connection with FIG. 17.

When the water supply controller timer reaches its set limit (e.g. twelve hours) such that it switches on the supply of water to the apparatus, the state of the control valve 450 is as shown with reference to FIG. 24A. The spring 448 is expanded to force the control shaft 440 upward, as shown, so that the supply conduit 486 is hydraulically-coupled to the cylinder rod sub-chamber 471 through the cylinder conduit 473. The drain conduit 487 and the bowl-fill conduit 489 are isolated, and not in hydraulic communication with any other part of the system.

The hydraulic communication between the supply and the rod sub-chamber 471 of the cylinder is also shown schematically with reference to FIG. 23B. The button 383 is up. The water under pressure fills the rod sub-chamber 471, driving the piston deeper into the cylinder. This, in turn, as shown with reference to FIG. 22, pulls on the cable 452, which pulls the lifting arm to pivot around the pivot pins 481a, 481b, as described above.

As shown in FIG. 22, as the piston moves downward and the lifting arm is pulled around the pivot pins, the bowl assembly tips up around the pivot shaft 481a, 481b (clockwise, as shown) and simultaneously spins around the long axis of the axle 465 and diameter D that pass through the pivot pins. FIG. 22 shows an intermediate position, in phantom at B, when the diameter D of the bowl has tilted upward approximately 45° around the pivot axis, and 90° around its diameter, so that the surface 422, which had been concave facing downward, is concave surface facing horizontal, toward the reader of the page. As the piston travels further into the cylinder, the diameter D of the bowl continues to tilt upward, until it is essentially vertical, as shown in phantom at C. Simultaneously, the bowl assembly has continued to spin around this diameter D, so that the surface 422** is now concave surface facing to the right, and the originally upward facing surface 422*** is now concave surface facing to the left.

FIG. 23C shows the situation of the cylinder 484 when the piston reaches the deepest extent of its travel into the chamber 470 and the bowl has completely tipped upward and flipped. The valve trigger 479 engages the shaft button 483 and presses it downward, so that the selecting shaft 440 moves to the position shown with reference to FIG. 24B. In this position, the supply 486 is no longer coupled to the cylinder 471 through the cylinder chamber 446 and the cylinder conduit 473. Rather, the supply is now coupled to the bowl-fill conduit 489, through the bowl-fill chamber 444. The cylinder is coupled to the drain 487, through the cylinder conduit 473 and the cylinder chamber 446.

Thus, water begins to pass, under pressure, through the bowl-fill conduit 489, from which it spouts out, into the air, and, eventually, as the bowl returns to horizontal, as explained below, into the bowl 420, with the new bowl face 422 now concave surface facing upward. At the same time, the cylinder chamber is now in communication with the drain 487. The bowl assembly is no longer being pulled upward by the linkage under pressure, and it begins to pivot downward under the influence of gravity around the pivot shaft 481, in reverse of the direction that it rose. As the bowl returns to horizontal, it pulls on the linkage, which pulls the piston upward, thus draining the upper, rod chamber 471** of the cylinder.

The button 483 and spool valve 440 are self energizing, by virtue of the self-energizing passage 490, so that they stay in the position shown in FIG. 24B until the pressure is removed even though the trigger is no longer pushing on the button 483. This is because the pressure is provided to the latch surface 492 of the spool value 440, which pressure is high enough to overcome the force from the deformed spring 448.

The return of the bowl is decoupled from the bevel gears by the one-way clutch 476, so that as the bowl assembly returns to have its diameter horizontal, the swinging axial bevel gear 456 also returns, and rotates around its axis, while meshing with the fixed bevel gear 458, but the bowl assembly 420, does not rotate around its axis, as it did when the bowl assembly rose. Thus the bowl assembly tilts downward without spinning around its axis.

The bowl is shown to be essentially vertical at the phantom rendition C, which corresponds to the piston position at the extreme of its travel. In such a case, it is beneficial to provide some agency to help initiate the downward return of the bowls, because the vertical configuration may be semi-stable. A suitable agency is a return spring, suitable located and coupled to the bowl assembly 420, or the lifting arm 480, for example. Alternatively, the travel of the bowl assembly can be limited so that it does not achieve full verticality. In that case, gravity acting upon the center of gravity of the bowl assembly initiates the downward motion when force is no longer applied to the lifting arm 480 through the cable. Water continues to run through the system, filling the bowl, until the user set duration expires, and a controller valve shuts off the water. By this time, enough time has transpired for the bowl to have been filled.

The cylinder should preferably not be closed for several reasons. Freezing is one reason. The cylinder has an opening 430, so that any water that does collect in it will drain out, rather than filling and freezing, or causing other problems. Another problem is that leakage past the piston could fill the lower space 470 and eventually block the piston—even if it were not frozen. The cylinders of the control valve 450, which surround the ends of the spool valve 440, also each feature vent passages 494 and 496, for the same reasons.

Thus, another mechanism is disclosed that accomplishes emptying, flipping, and filling a dual faced bowl assembly with only a one valve, one cycle controller, that turns water on, provides it for a predetermined duration, and then turns it off.

The embodiment shown in FIG. 22 (discussed below) has only one actuator (piston 468), but couples that actuator to the bowl through a compound linkage that tips up the bowl so that a diameter moves from horizontal to near vertical, and simultaneously, as it is tipping upward, rotates it around the diameter.

Alternately, rather than using a compound linkage, two independent actuators could be used, similar to as shown in FIG. 18. The bevel gear assembly can be replaced by a rotary actuator similar to 878 shown in FIG. 19B, and the two actuators can be operated in series, or in parallel, as discussed.

Kinetic Aesthetic

It will also be appreciated that the relatively inexpensive, reliable flipping of the bowls, and periodic spraying, or spouting of water provides independent aesthetic elements to a garden or yard design. The form of the spouting water can be adjusted in a spray, or fan, or sheets, depending on artistic and aesthetic goals. The frequency of the bowl flip and fill can be increased to be of shorter duration than that required to maintain the bowls free of contamination, to provide a kinetic element to the yard and garden design. In fact, the designs can be modified slightly, so that the water continuously spouts, and maintains the bowls filled to overflowing at all times, while the flipping action occurs as required to maintain cleanliness. Multiple bowls can be provided in cascade arrangement, with some or all of them flipping as described.

Similarly, in the case of zoo animals, the kinetic and spouting features of the apparatus can be incorporated into a multitude of aesthetic features of animal habitats.

CONCLUDING SUMMARY

Many techniques and aspects of the inventions have been described herein. The person skilled in the art will understand that many of these techniques can be used with other disclosed techniques, even if they have not been described as being used together. Thus, the fact that a sub-combination of features that are described separately, may not be described in sub-combination, does not mean that the inventors do not regard any such sub-combination as an invention that is disclosed herein.

For instance, any of the following techniques and features can be used with any of the others: allowing a bowl to dry out before refilling; preventing a bowl from remaining full long enough for contaminants and other undesirable elements to grow and adhere; a two-or-more-faced bowl; using two separate bowls alternately; flipping a two-faced bowl; dumping a simple bowl; allowing a bowl to drain empty; mounting bowls on a pedestal, or on or near the ground; providing a split-pedestal, such as a yoke, or a split-bowl to allow flipping through pedestal; manually operating any of the foregoing; automatically operating any of the forgoing; driving an automatic apparatus using house water pressure, or an electric motor, or a combination thereof; controlling operation of components using a controller that triggers events based on timing, or sensors, or both, the timers including electronic, or mechanical timers, or any combination thereof; the sensors including dryness sensors, fluid level sensors, or any combination thereof; flipping a bowl through slightly more than 90° to an unstable position, from which it falls to a stable position in which a bowl is used; rotating the bowl under power into a proper position for the next fill; rotating a plural bowl consistently in the same direction, or reversing direction; using gears, cranks, links etc., to form the transmission from a flipping power source, to bowls to be flipped; using two bowls, or three or more; using the same source of liquid to both flip and fill bowls, or different sources; a one button-push user interface to establish duration of bowl replenishment; using a single cycle, one valve controller to control bowl flip, fill and wait functions; additional user interface features relating to layout and sequence of instructions; using a linear actuator whose linear motion is transduced into a rotary motion to rotate bowls around an axis; using a rotary actuator to rotate the bowls.

Some of the inventions disclosed herein are methods of maintaining a birdbath or animal water bowl free of contaminants or to minimize the presence of contaminants. Other inventions disclosed herein are apparatus that can be used to maintain a birdbath free of contaminants, according to methods disclosed herein, or other methods, and can also be used without regard to whether contaminants are to be avoided or not. Certain of the apparatus are novel in their own right, whether or not they are used in a manner to minimize the development of contaminants. For instance, the mechanisms shown to flip and fill plural bowls are novel and inventive regardless of whether they are used in a manner that minimizes contamination in a bowl. Other inventions disclosed herein are user interfaces for enabling a human user to conveniently set up an automatic bowl, as described, or a garden watering system. The techniques and apparatus described can also be used to minimize contaminants in pet, farm and zoo water bowls and other containers.

More specifically, a method is disclosed herein for maintaining an animal water bowl. The method comprises the steps of: providing a first bowl, having a concave surface; providing the first bowl with water; allowing water to remain in the first bowl for use; at a time before any significant quantity of matter has become adhered to the first bowl surface, removing substantially all of the water from the first bowl; drying the surface of the first bowl so that it is substantially dry; and repeating the steps of providing water, through drying, thereby enabling periodic use by an animal of the first bowl. The step of drying the first bowl surface may comprise allowing the first bowl to remain empty for a period of time sufficient for the surface of the first bowl to dry off so that it is substantially dry.

The method may further be practiced with two bowls, so that one bowl is always available for use. Such method further comprises the steps of: providing a second bowl; providing the second bowl with water; allowing water to remain in the second bowl for use; at a time before any significant quantity of matter has become adhered to the second bowl, removing substantially all of the water from the second bowl; drying the second bowl surface so that it is substantially dry; and repeating the steps of providing water, through drying, regarding the second bowl, thereby enabling periodic use by an animal of the second bowl. The method further entails timing the steps of providing the first bowl with water through drying the first bowl surface, relative to the steps of providing the second bowl with water through drying the second bowl surface, such that at substantially all times, at least one of the first and second bowls contains sufficient water for use by an animal.

The step of allowing water to remain in the first bowl for use may be beneficially conducted substantially simultaneously with the step of drying the second bowl surface, such that the first bowl is available for use while the second bowl surface is drying, and likewise with allowing water to remain in the second bowl while the first is drying.

The bowls may be of a configuration suitable for birds to bathe in. Or, the bowls may be of a size and configuration suitable for a household pet animal, such as a dog or a cat, to drink or eat from. Or, the bowls may be of a size and configuration suitable for a farm animal such as a cow, pig, horse, sheep, goat or chicken to drink or eat from.

The water can be removed from the bowl by tilting the bowl, or by draining the bowl through a port that has a removable closure. The drying step can be accomplished by hanging the bowl at an incline so that it dries. The bowl may be secured to a fixture by a hinge, with the drying step comprising releasing the hinge to hang the first bowl from the hinge with the concave surface, facing angled away from upward.

The first and second bowls may be a pair of back-to-back bowls, with their respective concave surfaces facing away from each other.

It is further possible for the first and second bowls to comprise two of a plurality of bowls having a concave surface, the bowls arranged with their concave surfaces facing generally away from a common axis. The plurality may be two or more, for instance, three, four or five.

With such a plurality, for example, for purposes of discussion, three, it is advantageous to arrange the bowls to rotate together about the common axis. The bowls are distributed around the axis, and are configured such that when one bowl has its concave surface facing upward, the combined three bowls with one filled, have a center of gravity that is spaced laterally from the axis, such that if the bowls are coupled to the axis free to rotate thereabout, and released to rotate, the bowls will rotate together such that a second of the three bowls is brought to have its concave surface upward facing position, as the first bowl tilts, and empties out any contained water. With such a combination, it is advantageous to provide the second bowl with water after the bowls have rotated together around the axis by an amount sufficient to advance the second bowl to a concave upward facing positions. This offset center of gravity arrangement can be achieved with two back-to-back facing bowls, or a plurality of three or more bowls.

A related embodiment disclosed herein is a method that uses two bowls. It comprises the steps of: providing a first bowl, having a concave surface; providing the first bowl with water; allowing water to remain in the first bowl for animal use; at a time before any significant quantity of matter has become adhered to the first bowl surface, removing substantially all of the water from the first bowl; allowing the first bowl to remain empty for a period of time sufficient for the surface of the first bowl to dry off; and repeating the steps of providing water to the first bowl through allowing it to remain empty. A second bowl is provided, and the same steps of providing water to allowing the bowl to remain empty are conducted with respect to the second bowl. The steps regarding the first bowl of providing water through allowing the first bowl surface to dry, are coordinated relative to the same set of steps regarding the second bowl, such that at substantially all times, at least one of the first and second bowls contains water for animal use.

The step of coordinating may be neatly accomplished by providing the first and second bowls as a back-to-back facing bowl assembly, such that when the first bowl is concave surface facing upward, the second bowl is concave facing downward, and vice versa. In such a case, the emptying may be accomplished by automatically flipping the bowl assembly with an actuating assembly. The actuating assembly can be powered by water pressure, or electrical power, or any other suitable power. The bowl assembly can be automatically flipped using a timer.

Another embodiment disclosed herein is an animal water bowl apparatus, comprising: an axle, having an axis of elongation; and a bowl assembly, rotatable around the axis of elongation, comprising: a first bowl, having a concave surface, coupled to the axle; and a second bowl, having a concave surface, arranged facing approximately 180° away from the concave surface of the first bowl, both the first and second bowls coupled to the axle to face away from and to rotate around the axis. The apparatus further comprises: an actuator, having a rest configuration and a couple for coupling the actuator to a power supply; a transmission that couples the actuator to the bowl assembly, to rotate the bowl assembly in a first, flipping direction; and a stop, configured to stop the bowl assembly from rotating more than approximately 180 degrees. The transmission comprises a one-way clutch that couples the actuator to the bowl assembly, so that: the clutch locks and transmits torque to the bowl assembly when the actuator moves from the rest configuration to a working configuration and applies torque to rotate the bowl assembly in the first, flipping direction; and the clutch slips and transmits essentially no torque to the bowl assembly when the actuator moves from the working configuration to the rest configuration so that the bowl assembly is free to rotate relative to the clutch. The apparatus also comprises a return element, coupled to the actuator to return the actuator to the starting configuration.

The couple may be suitable for coupling to a hydraulic pressure supply, for instance, a building water pressure network, such as a home.

With a particular embodiment, the bowl assembly is further configured to continue to rotate in the first, flipping direction, after the bowl assembly has rotated slightly more than approximately 90 degrees.

The stop may comprise a cam assembly having a cam follower and a cam surface, configured to interfere with each other to prevent rotation of the bowl assembly beyond 180 degrees when no torque is transmitted by the clutch. The stop may also comprise a spring loaded catch assembly.

If a cam assembly is used, a cam surface may comprise, a substantially planar surface, and the cam follower may comprise two spaced apart bearing surfaces. The cam surface may comprise a U-shaped surface portion with two spaced apart substantially planar terminal surface portions on either side of the U-shaped portion. The cam follower may comprise a roller cam with two spaced apart rollers. Or, it may comprise a sliding bearing with two spaced apart sliding follower posts.

Another embodiment of the water bowl assembly further comprises a linear bearing, coupled to a first end of the axle. The linear bearing is configured to permit the first end of the axle to translate substantially perpendicular to the axis. This embodiment also may further have a loose rotary bearing, coupled to a second end of the axle. The loose rotary bearing is configured to permit the first end of the axle to translate substantially perpendicular to the axis, while the second end of the axle remains translationally substantially stationary, relative to the axis. The loose bearing may also be referred to as a wobbly bearing.

An embodiment of a water bowl has a transducer comprising a hydraulic cylinder and piston with a rod, coupled to a crank. The crank is coupled between the piston rod and the bowl assembly such that motion of the piston rod relative to the cylinder rotates the bowl assembly around the axis.

A water bowl may further comprise, coupled to the bowl assembly, a cam assembly that is stable against rotation, in only two rotary positions of the bowl assembly, each stable position corresponding to one of the two bowls being positioned concave surface facing upward. Such a cam assembly and bowl assembly may be configured to fall freely, after the bowl assembly has rotated from a first stable configuration through an action angle that is slightly greater than 90 degrees, to a second of the two stable configurations. The action angle may comprise between approximately 91 degrees and approximately 110 degrees, and preferably, between approximately 95 degrees and approximately 100 degrees.

An embodiment of a water bowl may have a combined cam assembly and bowl assembly that are together characterized by a center of gravity, positioned such that as the bowl assembly rotates around the axis through an action angle of slightly greater than approximately 90 degrees, the cam assembly pivots, and lifts the center of gravity until the center of gravity is above a first of its two ends, and offset from vertical above the first of two ends in a direction that provides torque to the bowl assembly to rotate it in the first direction.

A bowl assembly can comprise as the transducer a rotary hydraulic actuator, coupled to the bowl assembly, such that energization of the rotary hydraulic actuator rotates the bowl assembly around the axis. A suitable rotary hydraulic actuator may comprise: a vane, coupled to the bowl assembly; and a housing having a semi-cylindrical open chamber, having a hydraulic supply port and a hydraulic outlet port, spaced apart within the open chamber at least approximately 90°. The vane may be configured to travel from a first position adjacent the supply port, which corresponds to the rest configuration of the actuator, to a stop, beyond the outlet port, and then to return to the rest position. It is advantageous for the outlet port to be coupled to a conduit arranged to conduct water into the water bowl after the bowl assembly has rotated through the approximately 180°.

Also disclosed herein is a bowl assembly, comprising: a plurality of at least two bowls, each having a concave surface, the bowls arranged with their concave surfaces facing generally away from an axis; a couple that couples the bowls rotatably to an axle arranged so that the bowls rotate together about the common axis, and a releasable catch, which, when engaged, restrains the plurality of bowls in a fixed rotational position, with one of the bowls concave surface facing upward. The bowls are further configured and arranged, such that when one bowl is concave surface facing upward, the other at least one bowls are distributed around the axis, such that when the upward facing bowl contains water, the combined bowls have a center of gravity that is spaced laterally from the axis, such that when the catch releases the bowls, allowing them to rotate about the axis, the bowls rotate together such that a second bowl is brought to a concave surface upward facing position, as the first bowl tilts, and empties out the contained water. The plurality may be two, three, four, five or more bowls. The catch may be a spring loaded pin catch, a cam surface and a cam follower assembly, or any other suitable catch.

An animal water bowl is further disclosed, comprising: an axle, having an axis of elongation; and a bowl assembly, rotatable around the axis of elongation. The bowl assembly comprises: a first bowl, having a concave surface, coupled to the axle; a second bowl, arranged facing approximately 180° away from the first bowl, both bowls coupled to the axle to face away from and to rotate around the axis. A couple is configured to couple a power supply to an actuator. The actuator has a rest configuration. A transmission couples the actuator to the bowl assembly. The transmission is configured to: tip a first end of the axle upward, relative to a second end of the axle, such that the axle and the bowl assembly moves from a substantially horizontal rest position that corresponds to the rest configuration of the actuator, toward a more vertical position; rotate the bowl assembly around the axis, such that the first bowl surface moves from concave surface facing upward, to concave surface facing downward; and tip the first end of the axle downward, relative to the second end of the axle, such that the bowl assembly and the axle moves from the more vertical position back to the substantially horizontal rest position.

The transmission may be configured to rotate the bowl assembly around the axis at the same time as the transmission tips the first end of the axle upward. Or it may be configured to rotate the bowl assembly around the axis after the time that the transmission tips the first end of the axle upward.

With the serial version, the actuator has a range of travel from the rest configuration to an intermediate configuration. It is coupled to the transmission such that as the actuator moves to the intermediate configuration, the transmission tips the first end of the axle upward. The assembly further comprises a switch that is switched when the actuator reaches the intermediate configuration to conduct power to a second actuator that is part of the transmission, and which, when actuated, rotates the bowl assembly around the axis.

When used with a hydraulic system, an appropriate couple is one suitable for coupling the actuator to a pressurized water supply, the switch comprising a hydraulic valve, and both the first and second actuators comprising hydraulic actuators.

Or, the couple may be one suitable for coupling to an electric power supply.

A specific embodiment may have a transmission comprising a bell crank coupled at a first end to the actuator, and at a second end to the bowl assembly, such that the bowl assembly tips upward as the crank pivots around a pivot axis. The transmission may comprise a gear assembly, for instance, a bevel gear assembly, coupled to the axle, such that as the axle tips upward, gears of the gear assembly interact and causes the bowl assembly to rotate about the axle axis.

In many embodiments, the transmission further comprises a one-way clutch, coupling the bowl assembly and the actuator, such that after the bowl assembly has begun to tip downward, and as the actuator returns to the rest configuration, the clutch slips and the bowl assembly remains rotated with the first bowl surface concave surface facing downward.

Stated alternatively, the transmission may further comprise a one way clutch, coupling the bowl assembly and the actuator such that the clutch locks to prevent rotation of the bowl assembly in a first direction relative to the actuator, and slips to permit rotation of the bowl assembly in a second direction relative to the actuator.

The actuator may advantageously comprise a hydraulic cylinder and piston assembly. The hydraulic cylinder may be arranged such that the piston travels along a path that is between horizontal and 45° to horizontal, or, between vertical and 45° to vertical. A bowl water supply port is provided for filling the bowl with water. Such a supply port can be a bowl fill outlet within a piston cylinder arranged to direct water into a concave upward facing bowl surface. A control valve, can be provided and configured to direct water to the cylinder to actuate the transmission and rotate the bowl assembly, and also to direct water to the bowl fill outlet, which directs water to fill the concave upward facing bowl of the bowl assembly. The control valve can be configured to conduct water from a supply first to the cylinder and subsequently to block water to the cylinder and instead to direct water from the supply to the bowl fill outlet. It may constitute a self-latching valve, specifically, a spool valve.

An overall controller is typically provided. It may comprise: a duration memory element; a period timer; and a power on/off switch, coupled to the period timer to turn on water to the actuator at periodic times, to maintain the water provided for a duration of time embodied in the duration memory element and to cut off water after the duration has expired. The duration memory element embodies a duration that is sufficient to empty the bowl of water by rotating the bowl assembly about the axis approximately 180°, to return it to a rest position and to provide the concave upward facing bowl with water for the animal use. The duration memory element may be electronic, or mechanical, or electromechanical. It preferably comprises an element in which the duration is settable by explicitly activating the power on/off switch to turn on the hydraulic power to the actuator, and then explicitly activating the on/off switch to turn off the hydraulic power to the actuator, after the actuator has rotated the bowl about the axis approximately 180° and after the concave upward facing bowl has been provided with sufficient water for the animal use.

Also disclosed herein is a bowl assembly further comprising a controller, a period timer, a duration memory element, and a power on/off switch, wherein the duration memory element embodies a duration that is settable by explicitly activating the power on/off switch to turn on the hydraulic power to the actuator, waiting for the actuator to rotate the bowl around the axis approximately 180° and waiting for the concave upward facing bowl to be provided with sufficient water for the animal use, and then explicitly activating the on/off switch to turn off the hydraulic power to the actuator. The duration is equal to the total duration to rotate the bowl and to provide sufficient water. The duration memory element is set with the duration as a result of the explicit activations of the power on/off switch, and the power on/off switch further is coupled to the periodic timer and the duration memory element, to turn power on at periodic times and to maintain the power on for the duration, and no longer.

With all embodiments disclosed herein, the configuration can be suitable for animal use including, bird bathing, domestic pet animal watering, and farm animal watering.

A related embodiment disclosed herein is a user interface for an animal water bowl comprising: a water supply inlet; a water supply outlet; and a valve that couples the water supply inlet to the water supply outlet. The interface also includes: a period timer memory; a duration memory element; a user duration set switch; and a controller that is coupled to the user duration set switch. The valve, period timer memory the duration memory element, and the controller are operative to: set the duration memory element to a duration equal to a duration that a user maintains the user input switch in a duration set configuration; open the valve to connect the water supply inlet to the water supply outlet at periodic times stored by the period timer memory; maintain the valve open for the duration set on the duration memory element; and close the valve at the expiration of the duration.

The user duration set switch of such an interface may comprise a button that has a rest position and an activation position, and that requires the application of continuous force to stay in the activation position. Or, it may be a switch that has an on position and an off position, and that requires an explicit user action to move the switch from the off position to the on position and from the on position to the off position.

The user interface may further comprise a period indicator, that is selectably movable between a plurality of positions, each of which correlates to a different period of time, and is differentiable from the others, the controller being coupled to set the period timer memory to the period of time indicated by the period indicator.

The user interface, further may comprise: a faucet fitting; a conduit having an inlet, coupled to the faucet fitting and two outlets, one of which is coupled to the water supply inlet; a hose fitting coupled to the other of the two conduit outlets; and a valve, situated within the conduit. The valve is arranged such that when set to a first configuration, the faucet fitting is hydraulically coupled to both the hose fitting and the water supply inlet, and when set to a second configuration, the faucet fitting is hydraulically coupled only to the water supply inlet and not to the hose fitting.

With a slightly different focus, also disclosed herein is a bowl system, comprising: a bowl assembly, having a body portion and two oppositely facing bowl surfaces, each bowl having a concave surface that faces away from the concave surface of the other bowl by approximately 180°, the bowl assembly characterized by a center of gravity; an axle, having an axis of elongation; and a one way clutch. The clutch is coupled to the axle and to the bowl assembly such that: forcing the axle to rotate in a first direction, relative to the bowl assembly, locks the clutch and torque is transmitted from the axle through the clutch to the bowl assembly, such that the bowl assembly is also forced to rotate in the first direction; and forcing the axle to rotate opposite the first direction slips the clutch, and essentially no torque is transmitted from the axle, through the clutch, to the bowl assembly. The bowl assembly also includes a cam assembly comprising: a cam follower element, coupled to rotate with the bowl assembly around the axle, the cam follower element having a first bearing region and a second bearing region; and a cam surface that remains fixed relative to the rotation of the bowl assembly. The cam surface is shaped, and the cam followers are arranged, such that: during rotation of the bowl assembly in the first direction from an orientation with one of the bowls concave surface facing upward, gravity acts on the center of gravity to apply a torque upon the bowl assembly opposite the first direction; rotation of the axle in the first direction forces the bowl assembly to rotate with the axle, and forces a first of the cam follower bearing regions to move along the cam surface, such that the center of gravity of the bowl assembly rises to a maximum height, while being supported in part by the first of the follower bearing regions resting upon the cam surface, and in part by the axle, through the clutch; and further rotation of the axle in the first direction causes the bowl assembly to rotate, such that the center of gravity moves beyond a point where gravity pulls the bowl assembly to rotate in the first direction, to a point where the clutch slips, the bowl assembly is no longer supported by the axle, and the center of gravity of the bowl assembly and cam assembly falls until both the bearing regions rest upon the cam surface.

The first and second cam bearing surfaces may each comprise a cylindrical surface, which may be either a roller, or a non-rolling element. If non-rolling, the cam bearing surfaces may comprise cylindrical end surfaces of a unitary oblong bearing element.

The bowl assembly may further comprise a linear bearing, adjacent the cam follower element, coupled to the axle so that the axle can translate vertically at one end.

A hydraulically powered water bowl assembly for animal use is disclosed. The bowl assembly comprises: a bowl assembly support; an assembly of at least two bowls, each bowl having a concave surface, the concave surfaces arranged to face generally away from each other, the bowl assembly supported by the support. There is also a couple suitable to couple to a supply of pressurized water, the couple comprising only one output valve. A user input device, has a dual position on/off control element, which is settable by a user to an on position for a duration, and then settable to an off position. A controller is coupled to the user input device. The controller has a duration memory element that maintains memory of the duration, based on a duration that a user sets the control to the on position, and which is coupled to the output valve and is operative to maintain the output valve open for the duration. A hydraulic actuator is coupled to the water output valve and to a transmission that is coupled to the bowl assembly. The actuator and the transmission are configured to operate during the duration under power of water from the output valve, to move the bowl assembly such that a first bowl concave surface is moved from facing upward to facing not upward, so that any contained water is poured out, and such that a second bowl concave surface is moved from facing not upward to facing upward, and further such that the second bowl concave surface is filled with water, also from the output valve.

Yet another embodiment disclosed herein is an animal water bowl comprising: a bowl assembly, having a body portion and two oppositely facing bowls, each bowl having a concave surface that faces away from the concave surface of the other bowl at approximately 180°; a support configured to support the bowl assembly with a first of the bowl surfaces facing upward, capable of holding water, and the second of the bowl surfaces facing downward, such that substantially no water remains in the second bowl surface and the second bowl surface can dry; and a bowl retainer, configured to couple the bowl assembly to the support such that the bowl assembly is releasably retained with a first of the surfaces facing upward for a period of time, and subsequently releasable and releasably retained with the second of the surfaces facing upward for a period of time.

The bowl retainer may comprise an axle that rotatably couples the bowl assembly to the support. Or the bowl retainer may comprise mating geometries on the bowl assembly and the support that releasably engage each other and prevent lateral movement of the bowl assembly relative to the support. For instance, either the concave surface, or the support may comprise a concave surface that mates with a post in the other.

The water bowl may also comprise a releasable stop that releasably stops the bowl assembly at two positions that are approximately 180° apart from each other, each position characterized by a different one of the surfaces facing upward, and the other of the surfaces facing downward.

The water bowl as described immediately above, may further comprise: an actuator, coupled to the bowl assembly to move the bowl assembly from an orientation with a first of the surfaces facing upward to an orientation with the second of the surfaces facing upward and then to an orientation with the first of the surfaces facing upward; and a controller, coupled to the actuator, configured to couple the actuator to a source of power at periodic times The controller is coupled to automatically: move the bowl assembly from the orientation with the first of the surfaces facing upward to the orientation with the second of the surfaces facing upward; and maintain the bowl assembly with the first of the surfaces facing upward for a duration of time.

The controller is very advantageously configured to couple the actuator to the source of power without human intervention, after human operator set up.

The water bowl may further include: a couple to couple the controller to a source of water; a conduit coupled to the controller, the conduit arranged to direct water into an upward facing surface; and a valve coupled to the controller, the controller operative to cause the valve to open at periodic times, for the duration, thereby coupling the source of water to the conduit, and through the conduit, to the upward facing surface. The controller is configured to couple the actuator to the source of power, typically pressurized water, and to open and close the valve, without human intervention, after human operator set up.

This disclosure describes and discloses more than one invention. The inventions are set forth in the claims of this and related documents, not only as filed, but also as developed during prosecution of any patent application based on this disclosure. The inventors intend to claim the various inventions to the limits permitted by the prior art, as it is subsequently determined to be. No feature described herein is essential to each invention disclosed herein. Thus, the inventors intend that no features described herein, but not claimed in any particular claim of any patent based on this disclosure, should be incorporated into any such claim.

An abstract is submitted herewith. It is emphasized that this abstract is being provided to comply with the rule requiring an abstract that will allow examiners and other searchers to quickly ascertain the subject matter of the technical disclosure. It is submitted with the understanding that it will not be used to interpret or limit the scope or meaning of the claims, as promised by the Patent Office's rule.

The foregoing discussion should be understood as illustrative and should not be considered to be limiting in any sense. While the inventions have been particularly shown and described with references to preferred embodiments thereof, it will be understood by those skilled in the art that various changes in form and details may be made therein without departing from the spirit and scope of the inventions as defined by the claims.

The corresponding structures, materials, acts and equivalents of all means or step plus function elements in the claims below are intended to include any structure, material, or acts for performing the functions in combination with other claimed elements as specifically claimed.

What is claimed is:

1. A method for maintaining an animal water bowl, said method, comprising the steps of:
   a. providing a first bowl, having a concave surface;
   b. providing said first bowl with water;
   c. allowing water to remain in said first bowl for use;
   d. at a time before any significant quantity of matter has become adhered to said first bowl surface, removing substantially all of said water from said first bowl;
   e. drying said surface of said first bowl by allowing said first bowl to remain empty for a period of time sufficient for said surface of said first bowl to dry off so that it is substantially dry;
   f. repeating said steps b, providing water, through e, drying, thereby enabling periodic use by an animal of said first bowl;
   g. further comprising the steps of:
      i. providing a second bowl, having a concave surface;
      ii. providing said second bowl with water;
      iii. allowing water to remain in said second bowl for use;
      iv. at a time before any significant quantity of matter has become adhered to said second bowl surface, removing substantially all of said water from said second bowl;
      v. drying said second bowl surface so that it is substantially dry; and
      vi. repeating said steps, ii, providing water, through v, drying, regarding said second bowl, thereby enabling periodic use by an animal of said second bowl;
   h. timing said steps: b, providing said first bowl with water through e, drying said first bowl surface, relative to said sub-steps g. ii., providing said second bowl with water through q. v., drying said second bowl surface, such that at substantially all times, at least one of said first and second bowls contains sufficient water for use by an animal.

2. The method of claim 1, said bowls being of a configuration suitable for birds to bathe in.

3. The method of claim 1, said bowls being of a size and configuration suitable for a household pet animal selected from the group consisting of: dog and cat, to drink water from.

4. The method of claim 1, said bowls being of a size and configuration suitable for a farm animal selected from the group consisting of: cow, pig, horse, sheep, goat and chicken to drink water from.

5. The method of claim 1, said step of removing said water from said first bowl, comprising tilting said first bowl enough to pour out said water.

6. The method of claim 1, said step of removing said water from said first bowl comprising opening a port in said first bowl located such that when opened, water empties out through said port.

7. The method of claim 1, said step of drying comprising hanging said first bowl at an incline, such that said first bowl drains and said first bowl surface dries.

8. The method of claim 1, said first bowl being secured to a fixture by a hinge, with said concave surface facing upward, said step of drying comprising releasing said hinge to hang said first bowl from said hinge with said concave surface, facing angled away from upward.

9. The method of claim 1, said first and second bowls comprising a pair of back-to-back bowls, with their respective concave surfaces facing away from each other.

10. The method of claim 1, said step of allowing water to remain in said first bowl for use being conducted substantially simultaneously with said step of drying said second bowl surface, such that said first bowl is available for use while said second bowl surface is drying.

11. The method of claim 10, said step of allowing water to remain in said second bowl for use being conducted substantially simultaneously with said step of drying said first bowl surface such that said second bowl is available for use while said first bowl surface is drying.

* * * * *